United States Patent
Logan et al.

(10) Patent No.: US 11,359,483 B2
(45) Date of Patent: Jun. 14, 2022

(54) INTEGRATED DOWNHOLE SYSTEM WITH PLURAL TELEMETRY SUBSYSTEMS

(71) Applicant: EVOLUTION ENGINEERING INC., Calgary (CA)

(72) Inventors: Aaron W. Logan, Calgary (CA); David A. Switzer, Calgary (CA); Jili Liu, Calgary (CA); Justin C. Logan, Calgary (CA); Mingdong Xu, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 17/304,267

(22) Filed: Jun. 17, 2021

(65) Prior Publication Data

US 2021/0381367 A1    Dec. 9, 2021

Related U.S. Application Data

(60) Continuation of application No. 16/295,351, filed on Mar. 7, 2019, now Pat. No. 11,073,015, which is a
(Continued)

(51) Int. Cl.
    *E21B 47/13* (2012.01)
    *E21B 47/12* (2012.01)
    (Continued)

(52) U.S. Cl.
    CPC .............. *E21B 47/13* (2020.05); *E21B 7/04* (2013.01); *E21B 47/00* (2013.01); *E21B 47/12* (2013.01);
    (Continued)

(58) Field of Classification Search
    CPC . E21B 47/13; E21B 7/04; E21B 47/00; E21B 47/12; E21B 47/14; E21B 47/18;
    (Continued)

(56) References Cited

U.S. PATENT DOCUMENTS 4,945,761 A    8/1990    Lessi et al.
6,144,316 A    11/2000   Skinner
(Continued)

FOREIGN PATENT DOCUMENTS

CA    2617328 A1    8/2003
CA    2666695 A1    10/2007
(Continued)

OTHER PUBLICATIONS

National Oilwell Varco Blackstar EMWD brochure, Apr. 23, 2007.
(Continued)

*Primary Examiner* — Amine Benlagsir
(74) *Attorney, Agent, or Firm* — Oyen Wiggs Green & Mutala LLP

(57) ABSTRACT

A downhole system has a plurality of telemetry systems and a control system configured to obtain information from one or more sensors and transmit that information on one or more of the plurality of telemetry systems. The configuration of a controller may be changed so as to change which information is transmitted on a given telemetry system and how the information is to be transmitted on the given telemetry system.

12 Claims, 17 Drawing Sheets

Related U.S. Application Data division of application No. 15/433,626, filed on Feb. 15, 2017, now Pat. No. 10,253,621, which is a continuation of application No. 14/770,336, filed as application No. PCT/CA2014/050133 on Feb. 25, 2014, now Pat. No. 9,605,535.

(60) Provisional application No. 61/768,936, filed on Feb. 25, 2013, provisional application No. 61/769,033, filed on Feb. 25, 2013.

(51) Int. Cl.
*E21B 47/14* (2006.01)
*H04B 3/54* (2006.01)
*E21B 7/04* (2006.01)
*E21B 47/00* (2012.01)
*E21B 47/18* (2012.01)

(52) U.S. Cl.
CPC ............. *E21B 47/14* (2013.01); *E21B 47/18* (2013.01); *H04B 3/54* (2013.01); *H04B 2203/5458* (2013.01); *H04B 2203/5475* (2013.01)

(58) Field of Classification Search
CPC ............. H04B 3/54; H04B 2203/5458; H04B 2203/5475
See application file for complete search history.

(56) References Cited

U.S. PATENT DOCUMENTS

| | | |
|---|---|---|
| 6,188,222 B1 | 2/2001 | Seydoux et al. |
| 6,391,184 B1 | 5/2002 | Orolin et al. |
| 6,405,136 B1 * | 6/2002 | Li .................... H03M 7/30 702/10 |
| 6,902,414 B2 | 6/2005 | Dopf et al. |
| 6,909,667 B2 * | 6/2005 | Shah .................... E21B 47/18 367/83 |
| 7,163,065 B2 | 1/2007 | Zhang et al. |
| 7,348,894 B2 | 3/2008 | Bailey et al. |
| 7,462,957 B2 | 12/2008 | Camwell et al. |
| 7,552,761 B2 * | 6/2009 | Moriarty ............ E21B 47/20 166/73 |
| 7,565,936 B2 | 7/2009 | Zhang et al. |
| 7,573,397 B2 * | 8/2009 | Petrovic ............ H01B 17/20 340/854.6 |
| 7,839,719 B2 | 11/2010 | Dopf et al. |
| 7,880,640 B2 * | 2/2011 | Lovell ............ E21B 47/13 340/854.6 |
| 7,881,802 B2 | 2/2011 | Quiles et al. |
| 7,894,302 B2 * | 2/2011 | Aiello ............ E21B 47/12 367/83 |
| 7,994,932 B2 * | 8/2011 | Huang ............ E21B 47/20 340/854.3 |
| 8,022,839 B2 * | 9/2011 | Goodman ............ E21B 47/12 340/853.7 |
| 8,120,509 B2 | 2/2012 | Young |
| 8,154,420 B2 * | 4/2012 | Petrovic ............ E21B 47/017 340/854.6 |
| 8,483,849 B2 | 7/2013 | Recknagel et al. |
| 2003/0151977 A1 | 8/2003 | Shah et al. |
| 2004/0100393 A1 | 5/2004 | Sun et al. |
| 2006/0132335 A1 | 6/2006 | Kojima |
| 2006/0198242 A1 | 9/2006 | Geerits et al. |
| 2007/0247328 A1 | 10/2007 | Petrovic et al. |
| 2008/0095166 A1 | 4/2008 | Wiemann et al. |
| 2008/0136665 A1 | 6/2008 | Aiello et al. |
| 2009/0038851 A1 | 2/2009 | Camwell et al. |
| 2009/0045973 A1 | 2/2009 | Rodney et al. |
| 2009/0115625 A1 * | 5/2009 | Young .................. G01V 11/002 340/854.6 |
| 2009/0120689 A1 | 5/2009 | Zaeper et al. |
| 2009/0159334 A1 * | 6/2009 | Alberty .................. E21B 44/00 175/40 |
| 2009/0289808 A1 | 11/2009 | Prammer |
| 2010/0098045 A1 | 4/2010 | Miyazaki |
| 2010/0194586 A1 | 8/2010 | Tjhang et al. |
| 2010/0201540 A1 * | 8/2010 | Li .......................... E21B 47/13 340/853.1 |
| 2011/0139440 A1 | 6/2011 | Zolezzi-Garreton |
| 2012/0085583 A1 | 4/2012 | Logan et al. |
| 2012/0197528 A1 | 8/2012 | Le et al. |
| 2012/0256759 A1 | 10/2012 | Petrovic et al. |
| 2013/0134304 A1 * | 5/2013 | Beekman .................. G01T 1/40 250/269.6 |
| 2013/0135114 A1 | 5/2013 | Ringer et al. |
| 2013/0192357 A1 | 8/2013 | Ramshaw et al. |
| 2014/0167767 A1 | 6/2014 | Herrera et al. |
| 2015/0167392 A1 | 6/2015 | Sugiura |

FOREIGN PATENT DOCUMENTS

| | | |
|---|---|---|
| CA | 2624039 A1 | 9/2008 |
| CA | 2584671 C | 2/2009 |
| CA | 2544457 C | 7/2009 |
| CA | 2633904 C | 8/2009 |
| CA | 2634236 C | 8/2009 |
| CN | 101205806 A | 6/2008 |
| CN | 101358517 A | 2/2009 |
| MX | 2010008773 A | 2/2011 |
| WO | 2010121344 A1 | 10/2010 |
| WO | 2010121345 A1 | 10/2010 |
| WO | 2010121346 A1 | 10/2010 |

OTHER PUBLICATIONS

Extreme Engineering XPulse specification sheet, Oct. 9, 2012.
Cathedral Fusion MWD Brochure, Jan. 14, 2012.
www.mostardirectional.com, Oct. 7, 2011.

* cited by examiner

|  | CONFIDENCE IN EM DATA BEFORE COMPARISON | | |
|---|---|---|---|
|  | HIGH | MED | NO |
| HIGH (CONFIDENCE IN MP DATA BEFORE COMPARISON) | CONFIRMED OR USE BEST | CONFIRMED OR USE BEST | USE MP |
| MED | CONFIRMED OR USE BEST | CONFIRMED OR USE BEST | USE MP |
| NO | USE EM | USE EM | NO DATA |

FIG. 14

INTEGRATED DOWNHOLE SYSTEM WITH PLURAL TELEMETRY SUBSYSTEMS

CROSS-REFERENCE TO RELATED APPLICATIONS

This application is a continuation of U.S. application Ser. No. 16/295,351 filed 7 Mar. 2019, which is a divisional of U.S. application Ser. No. 15/433,626 filed on 15 Feb. 2017 and now issued as U.S. Pat. No. 10,253,621, which is a continuation of U.S. application Ser. No. 14/770,336 filed on 25 Aug. 2015 and now issued as U.S. Pat. No. 9,605,535, which is a 371 of PCT Application No. PCT/CA2014/050133 filed 25 Feb. 2014. PCT Application No. PCT/CA2014/050133 claims priority from U.S. Application No. 61/768,936 filed 25 Feb. 2013 and entitled DOWNHOLE TELEMETRY and U.S. Application No. 61/769,033 filed 25 Feb. 2013 and entitled DOWNHOLE ELECTROMAGNETIC AND MUD PULSE TELEMETRY APPARATUS, both of which are hereby incorporated herein by reference for all purposes as if fully set forth herein.

TECHNICAL FIELD

This application relates to subsurface drilling, specifically to downhole data acquisition and telemetry between downhole assemblies and surface equipment. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole probe. A downhole probe may comprise any active mechanical, electronic, and/or electromechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc. A downhole probe is typically suspended in a bore of a drill string near the drill bit.

A downhole probe may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc.

In directional drilling operations the drill bit is steered to cause the wellbore to follow a curved trajectory. In some cases the drill bit is rotated by a mud motor located in the BHA. A portion of drill string above the drill bit may have a bend in it which can be oriented to push or deflect the drill bit in a desired direction.

In order to control drilling so that the wellbore follows a desired trajectory it is valuable if not essential to have information about the current orientation of the drill bit. A crew may make intentional deviations from the planned path as necessary based on information gathered from downhole sensors and transmitted to the surface by telemetry during the drilling process. This information may be transmitted and acted upon in real time or near real-time. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other example telemetry techniques use hardwired drill pipe, fibre optic cable, or drill collar acoustic telemetry to carry data to the surface.

MP telemetry involves creating pressure waves in the circulating drill mud in the drill string. In MP telemetry, information may be transmitted by creating a series of pressure waves in the mud column. This may be achieved by changing the flow area and/or path of the drilling fluid as it passes a downhole probe in a timed, coded sequence, thereby creating pressure differentials in the drilling fluid. The pressure differentials or pulses may either be negative pulses and/or positive pulses or continuous wave. The pulses travel to surface where they may be detected by transducers in the surface piping. The detected pulses can then be decoded to reconstruct the data sent from the downhole probe. One or more signal processing techniques may be used to separate undesired mud pump noise, rig noise or downward propagating noise from upward (MWD) signals. The best data transmission rate achievable by current MP telemetry is about 40 bit/s. However, the achievable data rate falls off with increasing depth. It is not uncommon for MP data rates from deeper locations to be on the order of 1 to 2 bit/s.

A typical arrangement for EM telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface (higher frequency signals are typically attenuated more strongly than low frequency signals). The electromagnetic signals may be detected at the surface, for example by measuring electrical potential differences between the drill string or a metal casing that extends into the ground and one or more ground electrodes.

Advantages of EM telemetry relative to MP telemetry include generally faster data rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast). Also, as the EM transmission is strongly attenuated over long distances through the earth formations, it may require a relatively large amount of power for the signals to be detected at surface. The electrical power available to generate EM signals may be provided by batteries or another power source that has limited capacity.

Drill rig operators sometimes provide in a drill string multiple independently-operating telemetry systems, each coupled with sensor systems such that each telemetry system communicates to a surface receiver readings collected by the sensor systems with which it is coupled. This requires substantial duplication of parts and additional batteries in the BHA, resulting in increased length of the BHA, increased cost, and (insofar as the sensors are necessarily positioned further away from the drill bit in the elongated BHA) decreased relevance of sensor readings. Furthermore, such known multiple telemetry systems are not optimized for performance, reliability, and efficient use of power.

One challenge facing designers of downhole telemetry systems is to achieve acceptably high data rates. Especially when attempting telemetry from locations that are deep in a wellbore, data rates can be so slow that transmitting even relatively small amounts of data can take long times, e.g. several minutes. This interferes with the goal of maintaining real time control over the drilling operation and creates a bottleneck which can slow the progress of drilling. It would be of great benefit to the industry to provide ways to achieve higher rates of transmission of telemetry data.

Another challenge facing the industry is improving the reliability of telemetry equipment. This problem is exacerbated because the downhole environment is typically harsh—being characterized by high pressures, high flow rates of potentially erosive drilling mud, high temperatures and/or extreme vibration. These conditions stress equipment, especially electronic equipment. It would be of great benefit to the industry to provide fault-tolerant/fault-resistant telemetry systems.

Another challenge facing the industry is to extend the run-time of downhole equipment. Many downhole electronic systems are battery-powered. Batteries tend to be more reliable than downhole power generators. However, batteries have limited capacity. Tripping equipment out of a wellbore to replace batteries is time-consuming and expensive. Methods and apparatus which can allow battery-powered downhole electronic systems to function for longer times between replacing batteries would be of great value.

There remains a need for downhole telemetry systems and methods that ameliorate at least some of the disadvantages of existing telemetry systems.

SUMMARY

The invention has a number of aspects. One main aspect relates to an architecture for downhole systems that facilitates the use of a plurality of telemetry systems. The architecture may be implemented in a way that provides great flexibility in configuring the systems to transmit data of various kinds to surface equipment. In some embodiments logically separate controllers are associated with each of a plurality of telemetry subsystems. Each controller may be configured to independently obtain sensor information (or other telemetry data) and to transmit the sensor information by way of the associated telemetry subsystem. Another main aspect relates to different ways in which a downhole system may be configured to transmit data and different methods that may be executed by downhole systems for configuring the downhole systems and/or transmitting data to surface equipment. There is synergy between these main aspects in that the described architecture is particularly advantageous for configuring in the manners described and for practicing the described methods. However, these main aspects of the invention are also capable of separate application. Another aspect of the invention relates to methods and apparatus for receiving and decoding downhole telemetry data. In some embodiments the methods and apparatus integrate a plurality of telemetry receivers.

In some embodiments a downhole system is flexibly reconfigurable among multiple configurations without changing the physical structure of the downhole system. The reconfiguration may be accomplished by executing software instructions and/or by replacing electronically-readable configuration profiles for example.

One aspect provides telemetry systems that comprise a plurality of telemetry controllers each associated with a corresponding telemetry subsystem. The telemetry controllers may be configured to independently obtain and transmit parameter values, such as sensor readings using the associated telemetry subsystem.

Another aspect provides telemetry methods. Some such methods comprise automatically switching among different telemetry configurations based on one or more factors as described herein. Some such methods may comprise one or more of:
  conditionally transmitting certain data (e.g. certain parameter values).
  detecting a status of drilling operations at a downhole tool and switching among telemetry configurations based on the detected status.
  transmitting at least some of the same data by way of two or more different telemetry subsystems.

automatically inhibiting operation of one or more telemetry systems based on a configuration setting.

Another example aspect provides downhole systems comprising a plurality of telemetry subsystems and a control system comprising a plurality of telemetry controllers. Each of the plurality of telemetry controllers is associated and in communication with at least one telemetry subsystem of the plurality of telemetry subsystems. The system includes a data bus. Each of the plurality of telemetry controllers is in communication with each other telemetry controller of the plurality of telemetry controllers via the bus. The system includes one or more sensors in communication with the plurality of telemetry controllers. A first telemetry controller of the plurality of telemetry controllers is associated with a first telemetry subsystem of the plurality of telemetry subsystems and is operable to obtain first sensor information from a first set of the one or more sensors and to transmit the first sensor information on the first telemetry subsystem. A second telemetry controller of the plurality of telemetry controllers is associated with a second telemetry subsystem of the plurality of telemetry subsystems and is operable independently of the first telemetry controller to obtain second sensor information from a second set of the one or more sensors and to transmit the second sensor information on the second telemetry subsystem.

In some embodiments the first telemetry subsystem is an EM telemetry subsystem and the second telemetry subsystem is an MP telemetry subsystem. In some embodiments, all of the sensors are accessible by all of the plurality of telemetry controllers via the data bus such that any of the data controllers can obtain readings from any of the sensors. In some embodiments the sensors include a plurality of sensors of the same type such that one or more backup sensors are available in case one sensor fails.

Another example aspect provides methods comprising, from a downhole tool, transmitting values for one or more parameters using a telemetry protocol. The methods include storing the transmitted parameter values at the downhole tool and acquiring new values for the one or more parameters. The methods compare the new parameter values to the stored previously-transmitted parameter values and in at least some cases suppress transmitting the new parameter values if a difference between the new parameter values and the stored previously-transmitted parameter values is less than a threshold.

Another example aspect provides methods for transmitting data from a downhole location, the methods comprise obtaining a data unit to be transmitted to surface equipment; transmitting a first part of the data unit using a first telemetry subsystem and transmitting a second part of the data unit using a second telemetry subsystem. An advantage of some such methods is reduced latency.

Another example aspect provides methods for downhole telemetry, the methods comprise, at a downhole system obtaining a sensor value expressed as a plurality of digital bits by reading a sensor and dividing the plurality of bits into first and second sets of bits. The methods transmit the first set of bits using a first telemetry system and transmit the second set of bits using a second telemetry system. In some embodiments the first and second telemetry systems are of different types (e.g. an MP telemetry system or an acoustic telemetry system and an EM telemetry system).

Another example aspect provides methods for transmitting downhole measurement data to surface equipment. The methods comprise (a) reading downhole measurement data; (b) selecting an available telemetry transmission mode from a group consisting of: mud pulse (MP)-only telemetry mode, electromagnetic (EM)-only telemetry mode, MP and EM concurrent shared telemetry mode, and MP and EM concurrent confirmation telemetry mode; (c) when the MP-only telemetry mode is selected, encoding the measurement data into a first MP telemetry signal and transmitting the first MP telemetry signal to surface; (d) when the EM-only mode is selected, encoding the measurement data into a first EM telemetry signal and transmitting the first EM telemetry signal to surface; (e) when the concurrent shared telemetry mode is selected, encoding a first selection of the measurement data into a second MP telemetry signal and a second selection of the measurement data into a second EM telemetry signal, and transmitting the second MP and EM telemetry signals to surface; and (f) when the concurrent confirmation telemetry mode is selected, encoding the same measurement data into a third MP telemetry signal and into a third EM telemetry signal; and transmitting the third MP and EM telemetry signals to surface.

Another example aspect provides downhole telemetry methods. The methods comprise: (a) at a downhole location, reading measurement data and encoding some of the measurement data into an electromagnetic (EM) telemetry signal and the rest of the measurement data into a mud pulse (MP) telemetry signal, then (b) transmitting the EM and MP telemetry signals to surface wherein at least part of the EM and MP telemetry signals are transmitted concurrently.

Another example aspect provides downhole telemetry methods. The methods comprise (a) at a downhole location, reading measurement data and encoding the same measurement data into an electromagnetic (EM) telemetry signal and into a mud pulse (MP) telemetry signal, then transmitting the EM and MP telemetry signals to surface, wherein at least part of the EM and MP telemetry signals are transmitted concurrently; and (b) at surface, receiving the EM and MP telemetry signals, comparing the received signals and determining whether the signals meet a match threshold.

Another example aspect provides drilling methods comprising advancing a drill string while pumping drilling fluid through a bore of the drill string during active drilling periods separated by flow-off periods during which the flow of drilling fluid through the drill string is discontinued. The methods involve communicating telemetry data from a downhole system comprising an EM telemetry subsystem and an MP telemetry subsystem to surface equipment. The methods comprise establishing a changed MP data communication protocol for transmitting data using the MP telemetry subsystem, the changed MP data communication protocol to be effective upon commencement of an active drilling period after a flow-off period, and, during the flow-off period, transmitting header information for the changed data MP communication protocol from the downhole system to the surface equipment using the EM telemetry subsystem.

Another example aspect provides drilling methods comprising advancing a drill string while pumping drilling fluid through a bore of the drill string during active drilling periods separated by flow-off periods during which the flow of drilling fluid through the drill string is discontinued and communicating telemetry data from a downhole system to surface equipment. The methods comprise establishing a data communication protocol having slots for a plurality of specific data items and, at the downhole system, determining whether or not to transmit a specific one of the plurality of data items based on a comparison of a current value of the specific one of the plurality of data items with one or more previously-transmitted values for the specific one of the plurality of data items.

Another example aspect provides drilling methods comprising advancing a drill string while pumping drilling fluid through a bore of the drill string during active drilling periods separated by flow-off periods during which the flow of drilling fluid through the drill string is discontinued; and communicating telemetry data from a downhole system to surface equipment using one or both of EM telemetry and MP telemetry. The methods comprise, at the downhole system, detecting the beginning of one of the flow-off periods, assembling a header specifying a way in which data will be transmitted by EM and/or MP telemetry; and transmitting the header to the surface equipment using EM telemetry at a predetermined time after the beginning of the flow-off period.

Another example aspect provides drilling methods comprising advancing a drill string while pumping drilling fluid through a bore of the drill string during active drilling periods separated by flow-off periods during which the flow of drilling fluid through the drill string is discontinued; and communicating telemetry data from a downhole system to surface equipment using one or both of EM telemetry and MP telemetry. The methods comprise, at the downhole system, transmitting telemetry data by EM telemetry; monitoring an electrical output current of an EM telemetry transmitter; and, if the electrical output current meets or exceeds a predetermined threshold, automatically switching to transmit the telemetry data by MP telemetry.

Another example aspect provides downhole telemetry tools comprising: sensors for acquiring downhole measurement data; an electromagnetic (EM) telemetry unit; a mud pulse (MP) telemetry unit; at least one control module communicative with the sensors and EM and MP telemetry units and comprising a processor and a memory having encoded thereon program code executable by the processor to perform a method as described herein.

Another example aspect provides surface equipment for processing downhole telemetry signals. The surface equipment comprises an MP telemetry signal detector; an EM telemetry signal detector; a display; and a control system configured to: receive a first set of bits via the MP telemetry signal detector; receive a second set of bits via the EM telemetry signal detector; combine the first and second sets of bits to yield a data unit; and optionally display the data unit on the display.

Another aspect comprises a downhole tool comprising a pressure-tight housing and two or more telemetry drivers for different telemetry modes (for example EM and MP) contained within the pressure-tight housing.

Another aspect provides a receiver for telemetry information configured to track and display information identifying readings that have changed since data values were most recently updated.

Another aspect provides a telemetry system comprising: a plurality of telemetry subsystems and a control system comprising a plurality of telemetry controllers. Each telemetry controller is associated and in communication with at least one telemetry subsystem of the plurality of telemetry subsystems. Each telemetry controller of the plurality of telemetry controllers is in communication with each other telemetry controller of the plurality of telemetry controllers via a bus. One or more sensors is in communication with the plurality of telemetry controllers. A first telemetry controller of the plurality of telemetry controllers is configured to obtain first sensor information from a first set of the one or more sensors and to transmit the first sensor information on a first telemetry subsystem of the plurality of telemetry subsystems. A second telemetry controller of the plurality of telemetry controllers is configured to obtain second sensor information from a second set of the one or more sensors and to transmit the second sensor information on a second telemetry subsystem of the plurality of telemetry subsystems. The telemetry controllers may be configured to independently control whether or not the associated telemetry subsystem is operative to transmit data and/or to independently control what data is transmitted by the associated telemetry subsystem.

In example embodiments the telemetry subsystems comprise an EM telemetry subsystem and an MP telemetry subsystem.

Another aspect provides a method of configuring a telemetry system. The method comprises receiving first information and in response to receiving the first information, configuring a first telemetry controller to transmit a first sensor information on a first telemetry subsystem. The method further comprises receiving second information, and in response to receiving the second information, reconfiguring the first telemetry controller to transmit a second sensor information on the first telemetry subsystem. The work mode may be controlled by downlink information.

Another aspect provides a method of operating a telemetry system. The method comprises receiving, at a first controller, first sensor information from a first set of sensors, transmitting by a first telemetry subsystem, the first sensor information, receiving, at a second controller, second sensor information from a second set of sensors, and transmitting by a second telemetry subsystem, the second sensor information.

Another aspect provides a telemetry system comprising: one or more sensors; a first telemetry subsystem in communication with the one or more sensors; a second telemetry subsystem in communication with the one or more sensors; and a control system configured to obtain first sensor information from a first set of the one or more sensors and to transmit the first sensor information on a first telemetry subsystem and to obtain second sensor information from a second set of the one or more sensors and to transmit the second sensor information on a second telemetry subsystem.

Another aspect provides apparatus comprising any new useful and inventive feature, combination of features or sub-combination of features described or clearly inferred herein.

Another aspect provides a method comprising any new, useful and inventive step, act, combination of steps and/or acts, or sub-combination of steps and/or acts described or clearly inferred herein.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

FIG. 14 is a logic diagram applied by an example telemetry system to determine the confidence values of received EM and MP telemetry signals that were transmitted by a telemetry apparatus operating in concurrent confirmation mode.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Example Drilling Situation

Figure 1:
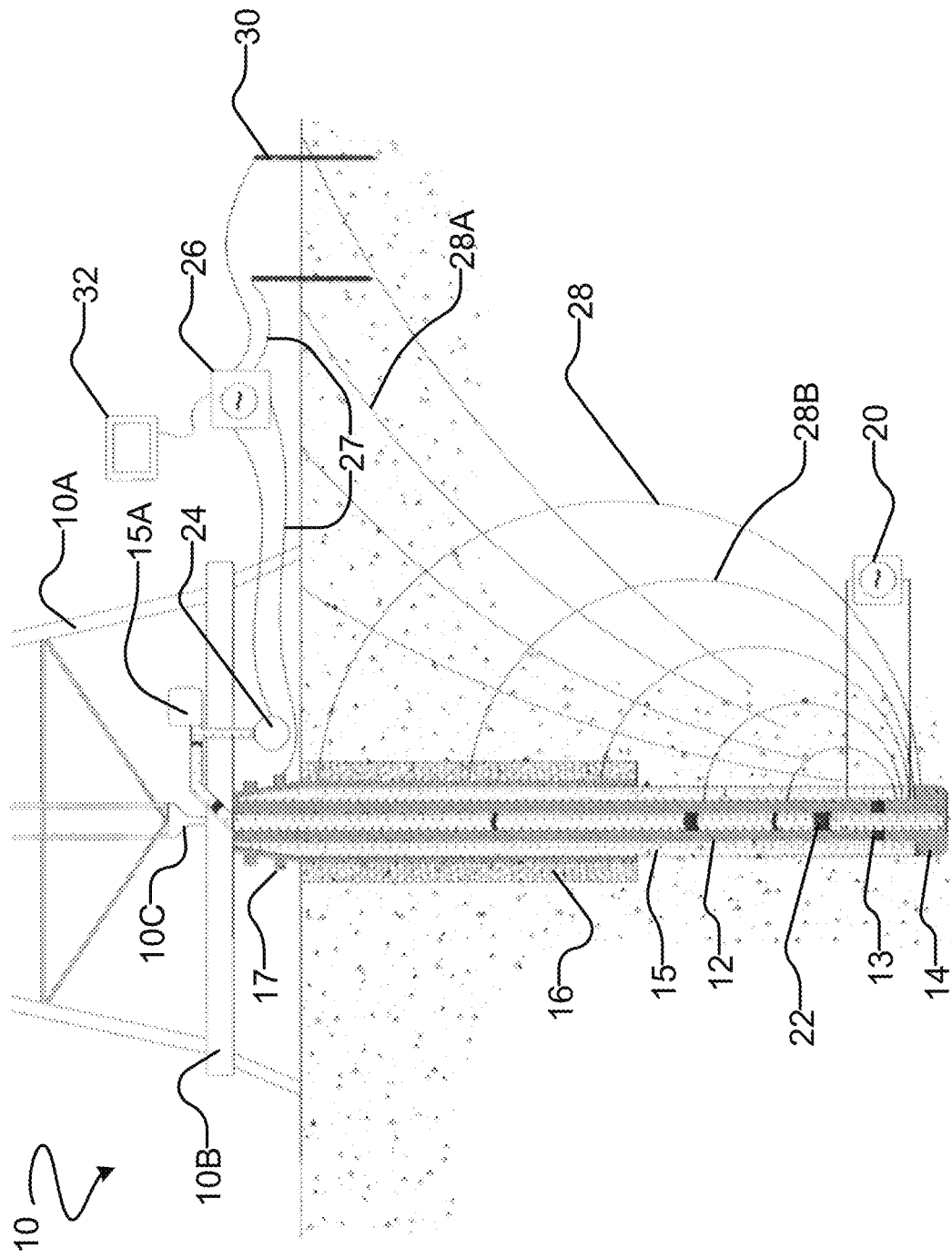
FIG. 1 is a schematic view of an example drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped by a mud pump 15A through an electrically isolating gap sub assembly 13, a bore in the drill string to the drill bit and returns to the surface through annular region 15 carrying cuttings from the drilling operation. As the well is drilled, a casing 16 may be made in the well bore. The casing may be surrounded by concrete. A blow out preventer 17 is supported at a top end of the casing. The drill rig illustrated in FIG. 1 is an example only. The methods and apparatus described herein are not specific to any particular type of drill rig.

The gap sub assembly 13 contains an electrically isolated (nonconductive) portion, creating an electrically insulating break, known as a gap, between the top and bottom parts of the gap sub assembly 13. The gap sub assembly 13 may form part of the BHA and be positioned at the top part of the BHA. Conducting portions above and below the gap sub assembly 13 may form the antennae of a dipole antenna. The dipole antenna may be used for EM telemetry.

Further, a system like that of FIG. 1 may include a system for communicating information between the surface and a downhole location. Thus it is possible to provide two-way communication between the surface and a downhole tool. The principles described herein may be applied to one-way data communication or two-way data communication or even to multi-way data communication between a plurality of downhole devices and the surface.

In the illustrated embodiment, a downhole system 20 is in data communication with surface equipment which includes a surface transceiver 26. Downhole system 20 may use two or more telemetry techniques to communicate data to surface transceiver 26. In some embodiments these telemetry techniques are distinct telemetry techniques (telemetry techniques that apply different physical principles for communicating data). For example, the telemetry techniques may be selected from: electromagnetic telemetry, mud pulse telemetry, drill string acoustic telemetry, mud acoustic telemetry, etc.

Downhole system 20 may comprise two or more hardware components which may be mounted at two or more separate locations (e.g. a mud pulse generator mounted to the drill string at a first location and an EM signal generator mounted to the drill string at a second location).

In an example embodiment that also has certain advantages the two telemetry techniques include electromagnetic telemetry and mud pulse telemetry. In mud pulse telemetry, data is communicated through the use of mud pulses 22, which are generated at a downhole location, received by a pulse transducer 24 and communicated to surface transceiver 26. Pulse transducer 24 may, for example, comprise a pressure sensor that detects variations in the pressure of the drilling fluid in drill string 12.

Electromagnetic telemetry comprises generating electromagnetic waves at a downhole location. The electromagnetic waves 28 propagate to the surface. FIG. 1 shows equipotential lines 28A and lines of current flow 28B representing an electromagnetic wave 28. These lines are schematic in nature as the earth is typically non-uniform. The electromagnetic waves 28 may be detected by surface transceiver 26. In the illustrated embodiment, surface transceiver 26 is connected to measure potential differences between one or more ground electrodes 30 and drill string 12.

Surface transceiver 26 may be coupled to pulse transducer 24, electrodes 30, and drill string 12 (the connection to drill string 12 may, for example, be by way of blow out preventer 17) by communication cables 27.

Surface transceiver 26 may comprise or be in communication with a computer 32. Computer 32 may comprise a data store for saving logged data. Computer 32 may also comprise a display by which received information may be displayed to one or more users.

Surface transceiver 26 may optionally be configured to transmit information to downhole system 20 using any one or more telemetry techniques for which surface transceiver 26 is equipped to transmit. This facility may enable users of drill rig 10 to send, for example, control information to downhole system 20 and, therefore, to the bottom hole assembly. Surface transceiver 26 may, in some embodiments, transmit data to downhole system 20 using one or more telemetry techniques for which downhole system 20 is equipped to receive (and not necessarily transmit) data. For example, in a drill rig 10 in which the drill string is driven from the surface, data may be transmitted to downhole system 20 by varying drilling parameters (such as speed and/or direction of rotation of the drill string). Surface transceiver 26 may also, or alternatively, transmit data to downhole system 20 using one or more telemetry techniques for which downhole system 20 is equipped to both receive and transmit data. For example, a downhole system 20 with electromagnetic telemetry capabilities may be configured to both receive and transmit data using electromagnetic telemetry.

Downhole System Architectures

Figure 2:
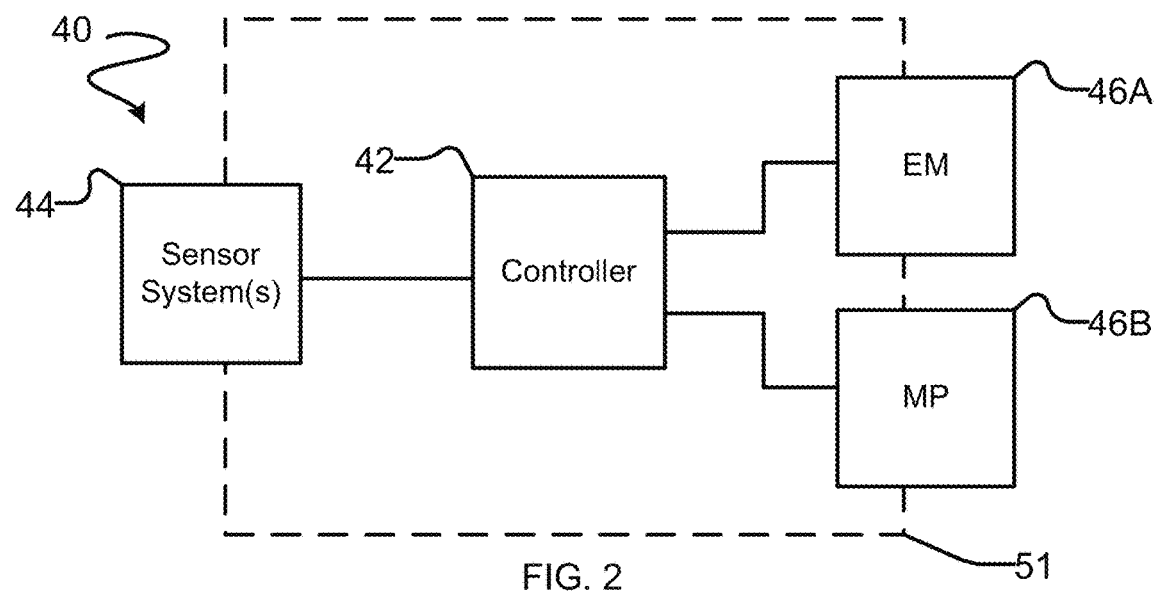
FIG. 2 is a logical diagram of an example telemetry system.
Figure 2A:
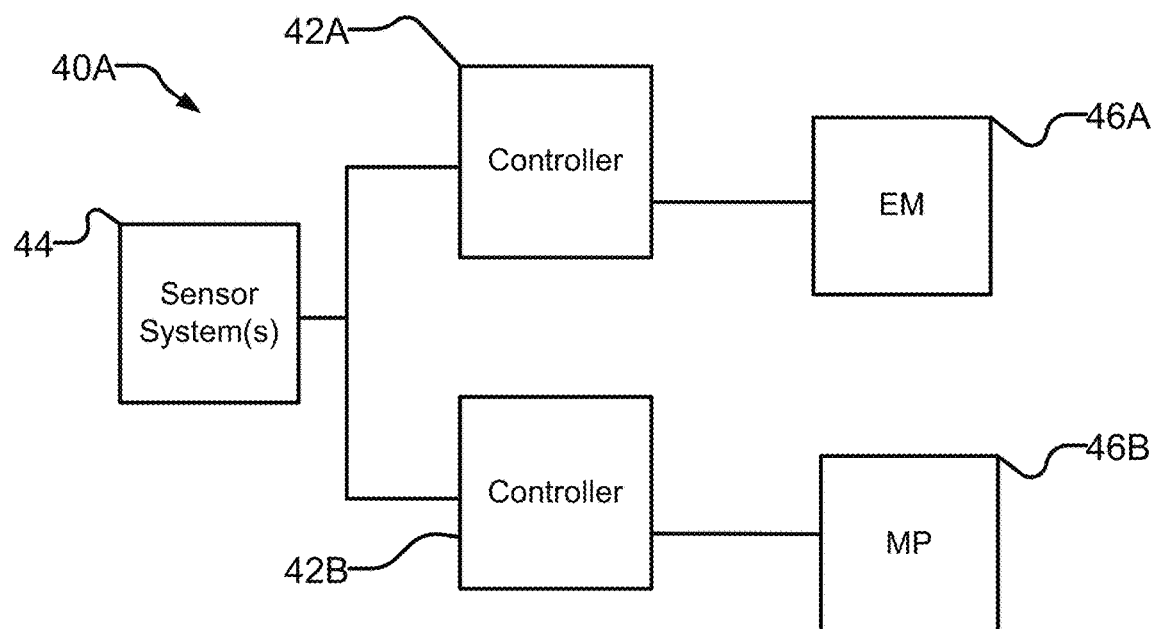
FIG. 2A is a logical diagram of another example telemetry system.

Downhole systems according to some embodiments of the invention provide two or more separate telemetry systems that may be applied in ways described herein to transmit data to surface equipment from downhole. FIGS. 2 and 2A show two examples of such downhole systems.

FIG. 2 shows logically an example downhole system 40. A control system 42 is in communication with one or more sensor systems 44 and one or more telemetry systems 46. Sensor system 44 may comprise a plurality of sensors. The sensors may be any sensors known in the art or later developed and could include, for example, one or more of: shock sensors, RPM sensors, flow sensors, direction and inclination sensors, accelerometers, magnetometers, gamma logging sensors, pressure sensors, resistivity sensors, temperature sensors, fluid property sensors, neutron sensors, and the like.

In the depicted example, telemetry systems 46 comprise one or more EM telemetry systems 46A and one or more MP telemetry systems 46B. Control system 42 receives sensor data from sensor system(s) 44 and provides all or part of the received data to one or more of the telemetry systems 46 for transmission.

Control System and Controllers

Control system 42 may comprise one physical device or a plurality of devices configured to work independently or collectively to receive and/or transmit data using telemetry systems 46. In some embodiments, such as the example embodiment depicted in FIGS. 2A and 3, each telemetry system 46 is associated with a corresponding controller. An additional number of controllers may be provided, each in association with one or more sensors of sensor system 44. All of these controllers may collectively make up control system 42.

A controller (e.g. control system 42 or separate controllers 42A and 42B or any other controller, control system or control module described herein) may comprise any suitable device or combination of devices. In some embodiments each controller comprises one or more programmable devices such as one or more devices selected from: CPUs, data processors, embedded processors, digital signal processors, microprocessors, computers-on-a-chip, or the like. The processor(s) may comprise, for example, embedded processors such as dsPIC33 series MPUs (multi-core processing units) available from Microchip Technology Inc. of Chandler, Ariz., USA. These programmable devices are configured by way of software and/or firmware to perform the required controller functions and are interfaced to other parts of the downhole system by way of suitable interfaces. In some embodiments two or more controllers may be implemented in software running on the same processor or set of processors. In addition or in the alternative to the use of programmable devices a controller may comprise logic circuits, which may be hard-wired, provided in custom IC chips, or the like and/or configurable logic such as field-programmable gate arrays (FPGAs).

Each controller may comprise one or more corresponding data stores. A data store may be separate or shared among two or more controllers. The data stores may comprise any suitable devices for storing data and/or software instructions. For example, the data stores may comprise memory chips, memory cards, read only memory (ROM), non-volatile memory, random access memory (RAM), solid-state memory, optical memory, magnetic memory or the like. The data store(s) may contain program code executable by the programmable device(s) to encode sensor measurements into telemetry data and to send control signals to telemetry units (e.g. an EM or MP telemetry unit) to transmit telemetry signals to the surface.

Housings

Figure 3:
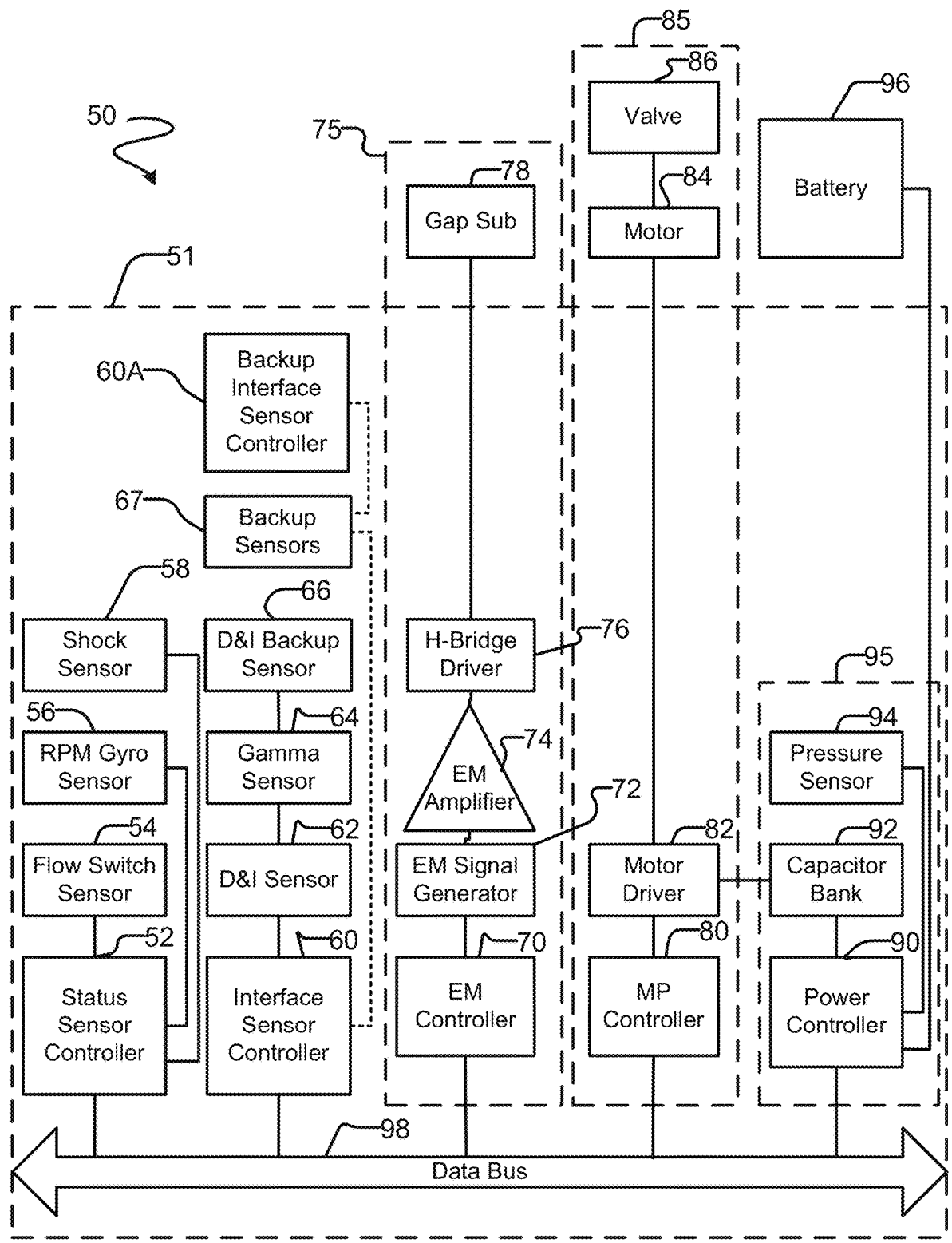
FIG. 3 is a schematic view of an example embodiment of a telemetry system according to FIG. 2.

The components of downhole systems as described herein may be at least partially contained in a housing (see e.g. element 51 in FIG. 3). For example, controller elements of a downhole system may be contained within housing 51. The housing may be constructed as a pressure-tight housing sealed to prevent ingress of fluids into the housing at pressures in the downhole environment.

Some or all of the sensor elements of the downhole system may optionally be located outside of housing 51. The elements contained within a housing 51 may be implemented on one or more circuit boards, connected by suitable electrical and logical wiring, and/or interconnected in any other suitable manner known in the art. The circuit board(s) may be printed circuit boards with one or more controllers soldered to the surface of the board(s). The circuit board(s) may be secured on a carrier device (not shown) which is fixed inside housing 51, for example by end cap structures (not shown).

In one embodiment, housing 51 comprises a single pressure-tight housing. It is advantageous to provide a compact telemetry apparatus that comprises drivers for two or more telemetry methods within a single pressure-tight housing. Some embodiments feature a probe housing 51 that is both shorter and wider than current industry standards. In a currently preferred embodiment, the probe housing is substantially shorter than current industry-standard telemetry probes, measuring less than 6 feet (about 2 meters), and preferably no more than 4 feet (about 1.3 meters) in length.

In some embodiments housing 51 comprises a cylindrical tube made up of two metallic parts with an electrically-insulating break between them. EM signals from a generator inside housing 51 may be connected to the metallic parts of the housing which may, in turn, be in electrical contact with the two sides of a gap sub. In some embodiments, housing 51 is positioned such that housing 51 spans the gap of the gap sub with portions of housing 51 extending to either side of gap sub 78.

It can be beneficial to configure apparatus 50 such that the electrically-insulating break in housing 51 is located away from sensitive electronics of apparatus 50. For example, the electrically-insulating break may be located near one end of housing 51. The electrically-insulating break can be anywhere along housing 51 in other embodiments. All that is required is a structure that permits two outputs of a signal generator to be connected to opposing sides of a gap sub.

Downhole systems as described herein are not limited to being housed in probes within a bore of a drill string. For example, all or part of a downhole system may be housed in a pocket within a wall of a drill string component.

FIG. 2A shows another example telemetry system 40A in which control system 42 comprises a dedicated controller for each telemetry system 46. FIG. 2A shows a controller 42A for EM telemetry system 46A and a controller 42B for MP telemetry system 46B. If additional telemetry systems are provided then additional controllers may be provided. The arrangement of FIG. 2A has particular advantages as discussed herein.

FIG. 3 shows schematically a downhole system 50 according to an example embodiment. Downhole system 50 is a more specific example of the general architecture exemplified by downhole system 40A.

Example telemetry apparatus 50 comprises a plurality of controllers which together make up control system 42. The illustrated embodiment includes status sensor controller 52, interface sensor controller 60, EM controller 70, MP controller 80, and power controller 90. Components of apparatus 50 are housed in a housing 51

Status sensor controller 52 is connected to sensors which monitor parameters relevant to the current status of the drill string. In some embodiments, outputs of one or more such sensors is used to control switching one or more systems of apparatus 50 on or off, to switch apparatus 50 among a number of operating modes or to otherwise control the operation of such systems. In the depicted embodiment, such sensors include flow switch sensor 54, which detects the status of the drilling fluid flow switch in the BHA, RPM gyro sensor 56, which detects rotation speed of the BHA and gyroscopic information, and shock sensor 58, which may detect shock forces encountered by the BHA in three-dimensions.

Status sensor controller 52 may, for example use readings from the associated sensors to distinguish between different drilling modes. For example, status sensor controller 52 may be configured to distinguish between a 'quiet' wellbore (no drilling fluid flow and no drill string rotation), 'sliding' operation (drilling fluid is flowing but the drill string is not being rotated significantly from the surface), and full-on drilling (drilling fluid is flowing and the drill string is being rotated from the surface). In some embodiments operation of apparatus 50 is automatically configured differently depending on the current drilling mode (as detected, for example, by status sensor controller 52).

Interface sensor controller 60 is generally in communication with sensors that monitor parameters that are indicative of characteristics of the surrounding formation and/or the position of the BHA relative to the formation. Such sensors may include, for example, direction and inclination sensor 62, gamma sensor 64, which measures the composition of the surrounding formation through the measurement of gamma emission, and direction and inclination backup sensor 66. Additional sensors of any suitable types may be provided.

In the illustrated embodiment, apparatus 50 has a set of backup sensors 67. Interface sensor controller 60 may connect to backup sensors 67 and/or a backup interface sensor controller 60A may connect to backup sensors 67. Backup sensors 67 may replicate some or all sensors in apparatus 50 to provide redundancy in case of failure of a main sensor. Readings from backup sensors may be used in various ways as described below.

Example EM Telemetry Hardware

EM controller 70 is in communication with an EM telemetry sub-system. In some embodiments the generator for EM signals comprises a power supply having first and second outputs and an H-bridge circuit connected to the outputs such that the power supply outputs can be connected to opposing sides of gap sub 78 (for example, by way of electrically separated conductive parts of housing 51) in either polarity. The power supply may, for example, comprise a current-limited DC power supply which applies power from a battery to the H-bridge circuit.

For example, in a first configuration of the H-bridge, one power supply output is electrically connected to an uphole side of gap sub 78 and the other power supply output is connected to the downhole side of gap sub 78. In a second H-bridge configuration the power supply outputs are reversed such that the first power supply output is electrically connected to the downhole side of gap sub 78 and the second power supply output is electrically connected to the uphole side of gap sub 78. The first and second power supply outputs are at different potentials (e.g. ground and a set voltage relative to ground or a set voltage positive with respect to a local ground reference and another set voltage negative with respect to a local ground reference).

An alternating signal of a desired frequency may be applied across gap sub 78 by switching the H-bridge between the first and second configurations described above at twice the desired frequency. An H-bridge driver 76 that includes the H-bridge circuit may be located at or near the electrically-insulating break in housing 51. This facilitates a relatively direct connection of H-bridge driver 76 to the sides of gap sub 78.

Figure 4:
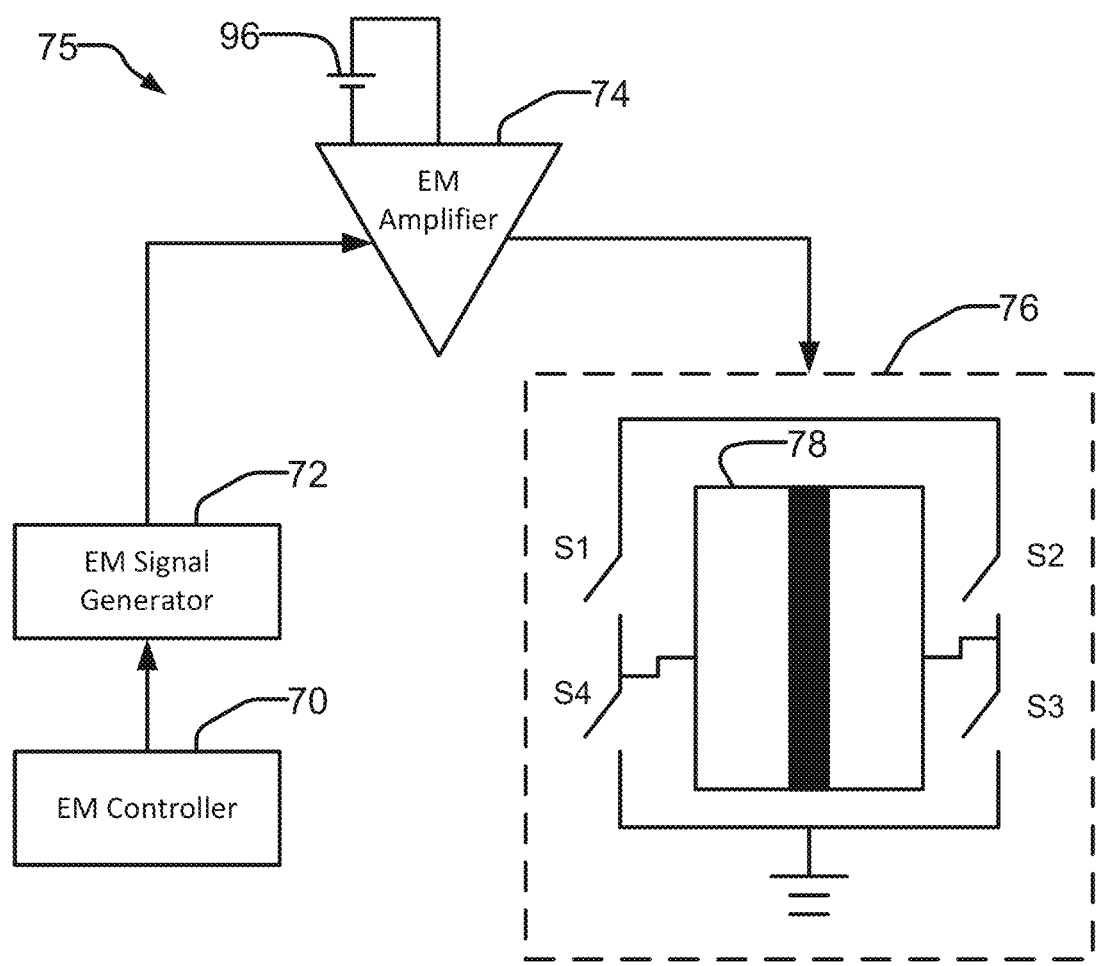
FIG. 4 is a schematic view of an example EM signal generator.

FIG. 4 shows a more detailed view of a possible arrangement for an EM telemetry transmitter. EM telemetry unit 75 comprises EM controller 70, signal generator 72, EM amplifier 74, battery 96, and H-bridge driver 76. An H-bridge circuit enables a voltage to be applied across a load in either direction, and comprises four switches of which one pair of switches can be closed and the other pair of switches left open to allow voltage to be applied between two outputs in one direction ("positive polarity pathway"), and another pair of switches can be closed while the first pair of switches is left open to allow a voltage to be applied between the two outputs in a reverse direction ("reverse polarity pathway"). In H-bridge driver 76, switches S1, S2, S3, and S4 are arranged so that switches S1 and S4 are electrically coupled to one side of the gap sub 78 and switches S2 and S3 are electrically coupled to the other side of the gap sub 78. Switches S1 and S3 can be closed to establish the positive polarity pathway such that a voltage applied across gap sub 78 generates a positive EM wave and switches S2 and S4 can be closed to establish the reverse polarity pathway such that the voltage applied across the gap of gap sub 78 generates a negative EM wave.

EM signal generator 72 is configured to receive a telemetry signal from EM controller 70 and to translate the telemetry signal into an alternating current control signal which is then sent to EM amplifier 74. Amplifier 74 is configured to amplify the control signal received from EM signal generator 72 using power from battery 96 and to then send the amplified control signal to H-bridge driver 76 which applies the amplified control signal across the gap of the gap sub with a polarity determined by the settings of the switches in the H-bridge circuit to generate EM telemetry signals.

In an example embodiment, EM signal generator 72 comprises a digital to analog converter (DAC) which is controlled to output a waveform that encodes data to be transmitted. The waveform may comprise a sine wave for example and the data may be encoded in the phase and/or frequency of the waveform. The waveform is amplified by amplifier 74. The gain of amplifier 74 may be set, for example by a configuration file, to adjust the amplitude of transmitted EM telemetry signals to a level that is capable of being received by surface transceiver 26. H-bridge driver 76, applies an alternating voltage across gap sub 78 on the exterior of housing 51. The polarity of the H-bridge circuit may be controlled according to the phase of the waveform output by amplifier 74.

The apparatus in FIG. 4 is just one of many possible ways of generating EM telemetry signals. Other ways of generating EM telemetry signals may be used with the invention described herein.

EM controller 70 may communicate any information accessible to it to users of a drill rig 10 by providing digital signals encoding such information to EM signal generator 72. For example, EM controller 70 may communicate information measured by one or more sensors and provided to EM controller 70 by the associated sensor controller, such as status sensor controller 52 or interface sensor controller 60.

EM controller 70 may use one or more modulation techniques to encode telemetry data into a telemetry signal comprising EM carrier waves. For example, EM controller 70 may use amplitude shift keying (ASK), frequency shift keying (FSK), phase shift keying (PSK), quadrature phase shift keying (QPSK) or combinations thereof such as amplitude and phase shift keying (APSK).

Example MP Telemetry Hardware

MP controller 80 controls the mud pulse telemetry sub-system by providing signals to a motor driver 82 which then operates motor 84. Motor 84 may then open and/or close valve 86 so as to increase or decrease pressure in the drill string 12 or otherwise induce acoustic pulses or oscillations in the drilling fluid in a pattern that encodes data. MP controller 80 may receive information from the surface by detecting the flow of drilling fluid in drill string 12. For example, a drilling operator may control the flow of drilling fluid in a pattern that conveys information to apparatus 50. This may be implemented, in some embodiments, by communicating the sensor readings of flow switch sensor 54 through status sensor controller 52 to MP controller 80. Alternatively, or in addition, MP controller 80 may be configured to have direct or indirect access to flow switch sensor 54, pressure sensor 94, or other sensor(s) configured to detect messages received from surface transceiver 26 or actions of a drilling operator without the use of intervening status sensor controller 52.

MP controller 80 may use one or more modulation techniques to encode telemetry data into a telemetry signal comprising mud pulses. For example, MP controller 80 may use amplitude shift keying (ASK), timing shift keying (TSK), or combinations thereof such as amplitude and timing shift keying (ATSK). The keying may optionally be binary keying as in, for example, binary phase shift keying (BPSK) or binary amplitude shift keying (BASK) or binary frequency shift keying (BFSK). The keying may optionally transmit symbols each representing a plurality of bits, for example, using 4PSK or 8PSK keying.

ASK involves assigning each symbol of a defined symbol set to a unique pattern of pulse amplitudes. TSK involves assigning each symbol of a defined symbol set to a unique timing position or combination of timing positions in a time period.

Figure 5:
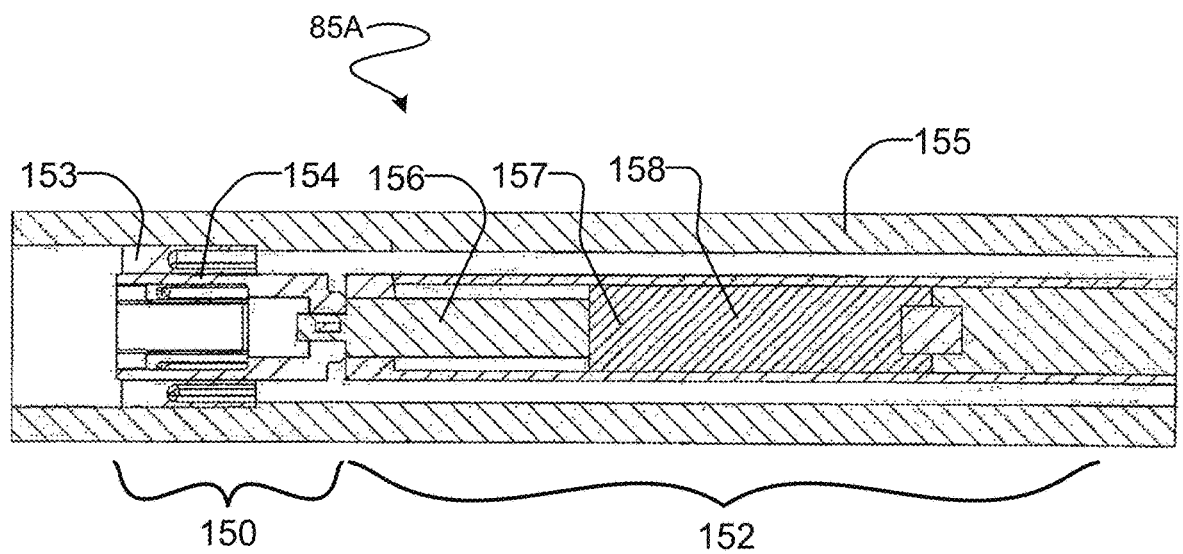
FIG. 5 is a cross-sectional view of an example MP signal generator.

FIG. 5 shows an example arrangement of an MP telemetry transmitter. MP telemetry unit 85A may be used in place of the simple combination of motor 84 and valve 86, as shown in FIG. 3. MP telemetry unit 85A comprises a rotor and stator assembly 150 and a pulser assembly 152 both of which are axially located inside a drill collar 155 with an annular gap therebetween to allow mud to flow through the gap. The rotor and stator assembly 150 comprises a stator 153 and a rotor 154. Stator 153 is fixed relative to drill collar 155 and rotor 154 is fixed to a drive shaft 156 of the pulser assembly 152. Pulser assembly 152 is also fixed relative to drill collar 155, although this is not shown in FIG. 5. The pulser assembly 152 also includes an electrical motor 157 which is powered by battery 96 (not shown in FIG. 5) and which is coupled to the drive shaft 156 as well as to associated circuitry 158 which in turn is communicative with the MP controller 80 (not shown in FIG. 5). The motor circuitry 158 receives the encoded telemetry signal from the MP controller 80 and generates a motor control signal which causes motor 157 to rotate rotor 154 relative to stator 153 (via driveshaft 156) in a controlled pattern to generate pressure pulses in the drilling fluid flowing through rotor 154.

The apparatus illustrated in FIG. 5 is just one of many possible ways of generating MP telemetry signals. Other ways of generating MP telemetry signals may be used in the systems described herein.

Power Management

Power controller 90 is in electrical communication with one or more power sources such as one or more batteries 96 and generally manages the provision of electrical power to all or some of telemetry apparatus 50. In some embodiments, power controller 90 may selectively provide power to any one or more of the controllers and/or their associated sub-systems and/or reduce or cut off power to certain of the controllers and/or sub-systems when possible to save power. In some embodiments, power controller 90 may cause certain controllers to switch into a low-power mode. For example, the power controller may cause one or more other controllers to operate at reduced clock rates to save electrical power. Power controller 90 may be provided with a capacitor bank 92 for the short- or long-term storage of energy.

In some embodiments power controller 90 is operable to turn ON or turn OFF the entire downhole system (with the possible exception of power controller 90 which may remain powered to enable turning the downhole system back ON in selected circumstances). Controller 90 may also be operable to selectively enable or disable individual telemetry units (e.g an EM telemetry unit and an MP telemetry unit), sensor systems etc. Which telemetry units, sensor systems etc. are powered at any given time may be determined by a configuration file for power controller 90.

In some embodiments, power controller 90 comprises or is connected to receive an output from a pressure sensor 94. Pressure sensor 94 senses pressure within the drill string. This pressure typically varies with depth in the wellbore. Power controller 90 may be configured to control power to certain sub-systems or controllers based on the output of pressure sensor 94. For example, power controller 90 may be configured to inhibit operation of the EM telemetry sub-system (e.g. by cutting off power to all or part of the EM telemetry sub-system) when housing 51 is at or near the surface (for example, by detecting an output from pressure sensor 94 indicating low pressure). This feature may improve safety by avoiding charging the exterior of housing 51 to significant voltages while housing 51 is at or near the surface.

Power controller 90 may optionally provide readings of pressure sensor 94 to other controllers either in response to requests from the other controllers or otherwise. In some embodiments, power controller 90 or one or more other controllers may be configured to switch system 50 among a number of different operational modes in response to changes in the readings from pressure sensor 94. For example, the different operational modes may transmit different data to the surface and/or transmit that data using different arrangements of one or more telemetry sub-systems. For example, for some depths system 50 may use EM telemetry, for other depths system 50 may use MP telemetry, at other depths, system 50 may use both EM and MP telemetry concurrently.

Power controller 90 may be connected to operate switches that connect or disconnect other parts of apparatus 50 from battery power. For example, when apparatus 50 is operating in a mode in which one telemetry system is not used, power management controller 90 may disconnect the supply of electrical power to the telemetry subsystem (including its controller). In a period when sensors are not being read, power management controller 90 may disconnect electrical power to the sensors and/or an interface to the sensors (e.g. interface sensor controller 60).

In some embodiments a separate power controller is not required. The functions of power controller 90 may be combined with those of another controller and/or distributed among other controllers in apparatus 50. For example, a controller may act as a power controller for an EM telemetry subsystem 75 and a sensor interface 60 as well as act as a controller for an MP telemetry subsystem.

Figure 3A:
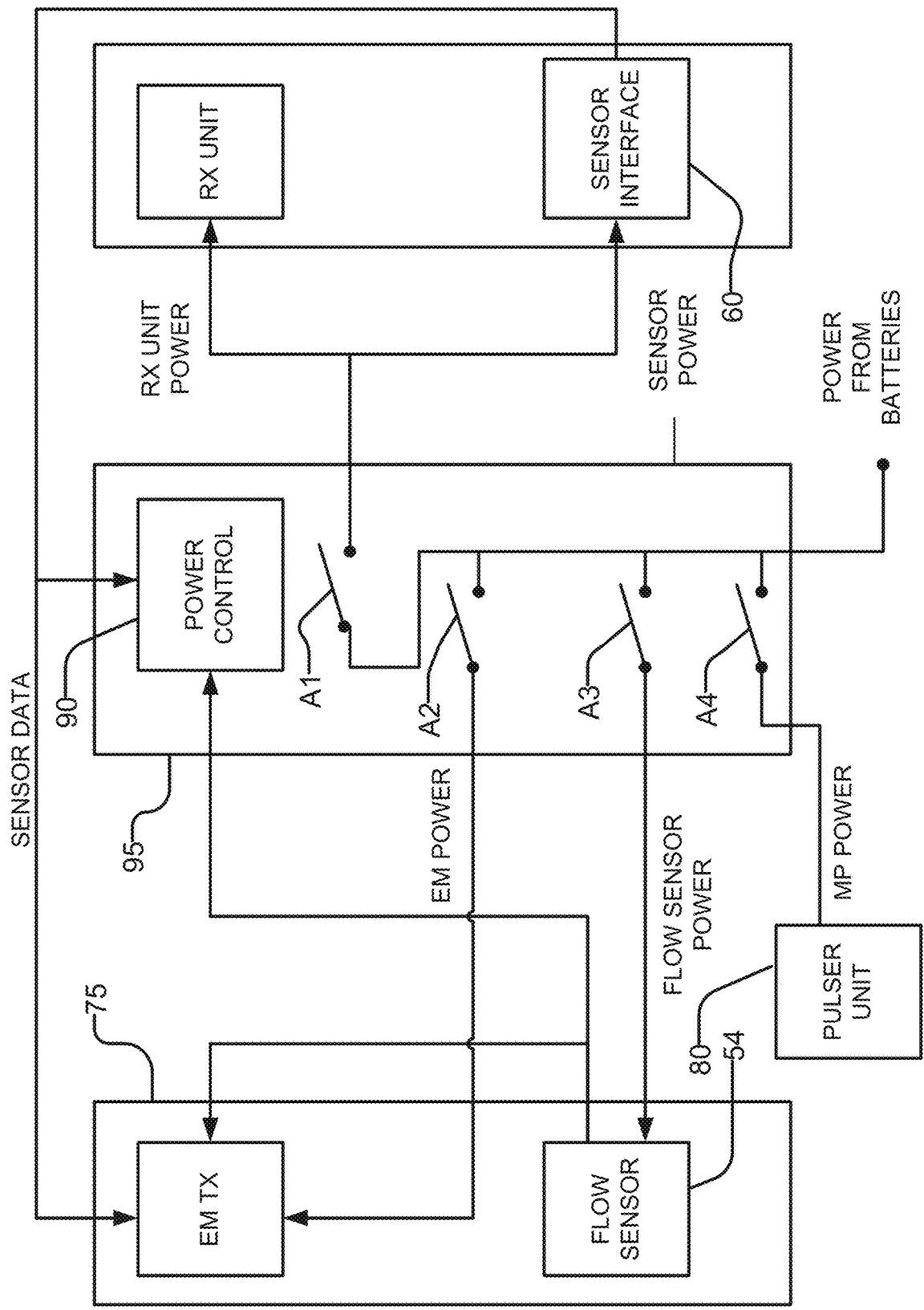
FIG. 3A is a block diagram illustrating an example embodiment of a telemetry system that includes a power control subsystem.

FIG. 3A shows an example embodiment in which a power control system 95 includes a power controller 90 connected to control operation of switches A1, A2, A3 and A4. A1 controls power to RX Unit and sensor interface 60. A2 controls power to EM system 75. A3 controls power to flow sensor 54. A4 controls power to pulser unit 80. Additional switches (not shown) may be provided to control connection of electrical power to other circuits of a downhole system.

The various controllers of control system 42 may be in communication via a data communications bus, such as a CAN (controller area network) bus 98. In other embodiments, the controllers may be in communication via any other suitable protocol, on physical or wireless networks, or in any other manner now known or later developed.

A downhole system according to any of the embodiments described herein may be in communication with other sensors, systems, components, devices or the like via data bus 98 or otherwise. For example, control system 42 may also, or alternatively, be in communication with a near-bit tool, which may provide to control system 42 measurements taken near to drill bit 14. Such measurements may be transmitted by telemetry system 40 in any of the ways disclosed herein.

In some embodiments, control circuitry (such as control system 42 and data bus 98) and other devices (such as capacitor bank 92) are integrated onto one or more short (e.g. 12-inch-long) carrier boards, together constituting a control system inside of housing 51. In some embodiments, the components of telemetry apparatus 50 are arranged in the following sequence: valve 86, motor 84, control system, sensor system 64, direction and inclination sensor 62, and battery 96. Such embodiments may be used in either orientation (i.e. valve 86 positioned on either the uphole or downhole end), but positioning valve 86 on the downhole end of the probe may reduce damage from the flow of drilling fluid on the seals of the probe.

It can be appreciated that at least some embodiments provide a single set of sensors and a system for managing data from the sensors while providing the flexibility to transmit any of the data by way of any one or more of a plurality of different telemetry links. In some embodiments data (whether the same data or different data) may be transmitted concurrently on two or more telemetry links. In some embodiments the system has a configuration which permits each of two or more telemetry systems (which may operate using physical principles different from one another) to operate independently of one another. A power management system may control the supply of power to the telemetry links from a common power source or set of power sources thereby facilitating better power management than would be possible if each telemetry link was powered from a separate source.

Example Data Transmission Methods and Configurations

In an example embodiment, a downhole system as described herein can be configured to transmit data in any of a number of different modes which differ from one another in respect of which telemetry systems are available and/or which telemetry systems are used to transmit data and/or in cases where more than one telemetry systems are available to transmit data which data is transmitted using each telemetry system and/or which parts of the downhole system are powered off.

Example Telemetry Modes

Different modes may specify the use of different telemetry systems or combinations of telemetry systems to transmit telemetry data.

EM-Only and MP-Only Modes

For example, a downhole system as described herein such as system 40 or 40A or 50 may have an EM-only mode (in which only an EM telemetry system—e.g. 46A, 75 is used to transmit data), an MP-only mode (in which only an MP telemetry system 46B, 85 is used to transmit data), or a concurrent telemetry mode (in which both the EM and MP telemetry systems are active and available to transmit data and may transmit data concurrently). In some embodiments, EM telemetry system 46A or 75 is powered down when system 40 is in MP-only mode and MP telemetry system 46B or 85 is powered down when system 40 is in EM-only mode.

Use of an EM-only mode can be particularly advantageous during times where there is no flow of drilling fluid ("Flow-off" conditions). At these times electrical interference is minimized and MP telemetry is not practical. EM telemetry may be used during these periods, for example, for rapid transmission of survey data. Sending survey data during pump-off conditions avoids delays waiting for survey data to be transmitted by MP telemetry after fluid flow is resumed. Furthermore, during pump-off conditions EM telemetry is typically least affected by noise and can be achieved from deeper depths and/or using lower power than would be required to transmit the same data while drilling is in progress. Use of an MP-only mode can be particularly advantageous while active drilling is occurring.

Concurrent Telemetry Modes

When transmitting data in a concurrent telemetry mode, the telemetry system 40 may be configured to transmit in a concurrent confirmation mode wherein the same telemetry data or closely similar but different telemetry data is transmitted by both of the EM and MP telemetry systems, or in a concurrent shared mode wherein some of the telemetry data is transmitted by the EM telemetry system, and the rest of the telemetry data is transmitted by the MP telemetry system. Combined modes are also possible (for example certain data may be transmitted by both of the EM and MP telemetry systems while other data is transmitted only by one of the EM telemetry system and the MP telemetry system). In other embodiments, modes of telemetry other than EM and MP telemetry may be used alone or in combination with MP and/or EM telemetry modes and/or in combination with one another.

Concurrent Confirmation Mode

The concurrent confirmation mode permits surface equipment (e.g. surface transceiver 26) or operators to compare the same data that has been transmitted by both telemetry units 46A, 46B or 75, 85 and which can be received and compared to each other at surface. In the concurrent confirmation mode, EM telemetry 46A and MP telemetry 46B are configured to transmit the same data roughly concurrently. The recipient of these two signals (e.g. surface equipment or an operator on the surface) can then decode them and compare the data transmitted by each of the telemetry systems 46. If the data matches, the recipient may take that as an indication that telemetry systems 46 are operating correctly. If the data does not match, then the recipient may attempt to correct its decoding methods or apparatus or may conclude that one or more of telemetry systems 46 is not operating correctly. In this way, a concurrent confirmation configuration profile may serve as a "system test" mode, or may offer additional redundancy when critical data is being transmitted. This is discussed in greater detail below with reference to FIG. 14.

In a concurrent confirmation mode, one of the telemetry units 46A, 46B or 75, 85 may be designated to be the primary or main transmitter. In some embodiments the MP telemetry unit 46B, 85 is set as the default primary transmitter. The controller for the primary telemetry unit may control requests for measurements to the sensors (e.g. sensors 54, 56, 58, 62, 64, 66, 94) and mirror the received measurement data to the controller for the other telemetry unit. In some embodiments, the flow and RPM sensor measurement data may be used to trigger transmission of EM and MP telemetry data.

In some embodiments data sent in a concurrent confirmation mode by different telemetry units may be similar but different. For example, data sent on one telemetry unit may include a parameter value sampled at a first time and data sent on another telemetry unit may comprise the same parameter value sampled at a second time different from the first time. In an example embodiment the first and second times are within a fraction of a second (e.g. within 100 ms or 50 ms) of one another.

A concurrent confirmation mode may be useful for determining which of two or more telemetry systems is better under current drilling conditions. Each system may transmit the same data at its own speed. The functionality of each telemetry system may be fully exploited. Critical information will be transmitted to the surface even if one telemetry system is not working well in the current drilling conditions.

Another application of concurrent confirmation mode is to test whether a particular telemetry system can be used effectively while ensuring that the necessary data will be received by transmitting the same data on another telemetry system. For example, when drilling an exploratory well it may not be known whether downhole conditions are amenable to EM telemetry. With EM and MP telemetry systems operating in a concurrent confirmation mode drilling can proceed even if EM telemetry proves to be impractical given the downhole conditions. If it turns out that the EM telemetry is functioning well then the speed advantage of EM telemetry over MP telemetry may be applied to allow the well to be drilled faster.

In embodiments where a downhole system has backup sensors (e.g. backup sensors 67), in some embodiments a downhole system operating in a concurrent confirmation mode is configured to send data from main sensors using one telemetry system and corresponding data from the backup sensors using another telemetry subsystem. This permits verification of the reliability of the sensor readings themselves. In an alternative mode, one telemetry subsystem may send averages of readings from main and backup sensors and the other telemetry subsystem may send readings from one or both of the main and backup sensors.

In some embodiments, a downhole system operating in a concurrent confirmation mode is configured to obtain data representing a value of one sensor at two spaced apart times and to transmit one of the resulting values using a first telemetry subsystem and another of the resulting values using a second telemetry subsystem. Since the values may be obtained at closely spaced apart times, comparison of the values may be used to assess the reliability of data transmission. In this mode the surface equipment can obtain faster sampling of the values of the sensor output than it would receive using a concurrent confirmation mode in which the same sensor reading was transmitted twice once by each of two different telemetry subsystems. This technique may be used, for example, to transmit values from higher density gamma logging.

Example Application of Concurrent Confirmation Mode

For transmissions made in the concurrent confirmation mode and referring to FIG. 14, the surface transceiver 26 and computer 32 may process and decode each EM and MP telemetry signal into their respective measurement data sets. The computer 32 may perform an error check bit matching protocol against each decoded data set and then assign a confidence value to each data set. The computer 32 may use error check bit matching protocols known in the art, such as a 1 bit parity check or a 3 bit cyclic redundancy check (CRC). More particularly, the downhole telemetry apparatus 50 may add CRC bits to the telemetry signal e.g. at the end of the telemetry signal ("telemetry data bits"), and the decoders of the surface transceiver 26 may be provided with the matching CRC bits ("error check bits") that will be compared to the CRC bits in the telemetry signals to determine if there were errors in the telemetry signal.

In one embodiment, each data set can be assigned one of three confidence values corresponding to the following:
High confidence—telemetry data bits match error check bits.
Medium confidence—telemetry data bits only match error check bits after modification of selected thresholds, e.g. amplitude threshold.
No confidence—telemetry data bits do not match error check bits, even after modification of selected thresholds.

The surface transceiver 26 may determine the signal to noise ratio of each received EM and MP telemetry in a manner that is known in the art.

The surface transceiver 26 may then compare the EM and MP data sets, and determine whether the data sets are sufficiently similar to meet a predefined match threshold; if yes, then the data sets are considered to match. More particularly, when both data sets are encoded using the same number of bits, the decoded data sets should have an exact match. In some embodiments the same or similar data values are encoded to a first precision using a first number of bits for transmission on a first telemetry subsystem or mode and are encoded to a second precision using a second number of bits for transmission by a second telemetry subsystem or mode. When the data sets are encoded using different numbers of bits to represent the same measurement data, the match threshold is met so long as the error between the two decoded data sets is within a specified range, e.g. less than the difference between a 1 bit change.

When the two data sets match and both have at least a medium confidence value, then either data set can be used to recover the measurement data. When the EM and MP data sets do not match, and both EM and MP data sets are assigned the same high or medium confidence value, the surface transceiver 26 may select the data set having the highest detected signal-to-noise ratio. When the EM and MP data sets do not match and the MP and EM data sets are assigned different confidence values, the surface transceiver 26 may select the data set having the highest confidence value. When both the EM and MP data sets are assigned a no confidence value, the surface transceiver 26 may output a "no data" signal indicating that neither data set is usable.

Concurrent Shared Mode

The concurrent shared mode operates like two separate telemetry systems. In this mode, each of the EM and MP telemetry units 46A and 46B or 75, 85 may be configured to obtain certain measurement data from sensors (e.g. some or all of sensors 54, 56, 58, 62, 64, 66, 94) and encode and transmit this data. For example, EM controller 70 may be configured to read gamma, shock and vibration measurements and encode these measurements into an EM telemetry signal, and MP controller 80 may be configured to read toolface measurements and encode these measurements into an MP telemetry signal.

A downhole system may be configured to cause more critical measurement data to be transmitted by the telemetry subsystem which is expected to be more reliable or faster during the present drilling conditions, and less critical measurement data to be transmitted by the other telemetry subsystem. Reliability of different telemetry subsystems may be measured on an ongoing or periodic basis. Which telemetry subsystem is faster or more reliable may change as depth and other drilling conditions change.

An example method that may be applied for assessing the relative reliability of telemetry data and selecting a telemetry mode based on that assessment is described below in relation to FIG. 14. In some embodiments, a telemetry subsystem is configured to periodically transmit predetermined test transmissions and the reliability of the data channel carried by the telemetry subsystem is evaluated by decoding the test transmissions and comparing the decoded test transmissions to the known content of the test transmissions. Such test transmissions may, additionally or in the alternative, be applied to monitor variations in attenuation of the transmitted telemetry system with depth in the wellbore. Such attenuation information may be applied to control the transmission of telemetry signals to compensate for such attenuation while conserving electrical power when possible.

As another example, where measures of reliability and timeliness (latency) for different telemetry modes is available, data may be allocated among the telemetry modes based on different factors for different data types. For example, for a first data category high confidence in the decoded data may be a primary concern. Data in the first data category may be transmitted using the telemetry mode for which the reliability measure indicates highest confidence in the transmitted data. For a second data category timeliness may be a primary concern. Such data may be transmitted using the telemetry mode for which the timeliness measure indicates lowest latency.

In some embodiments there is a third category of data for which both high confidence in the decoded data and timeliness are important. The third category is not necessarily distinct from the first and/or second categories. In such cases data in the third category may be transmitted using two telemetry modes, a faster but less reliable mode and a slower but more reliable mode. In some such embodiments, surface equipment decodes the data transmitted by the faster but less reliable mode when that data is received and makes that decoded data available. When the same data is received by the slower but more reliable mode the surface equipment may update the data, particularly if the decoded second-received data differs from the less-reliable first-received data. Where the data is displayed on a display the display optionally includes an indication as to the level of reliability of the data currently being displayed. In some embodiments the display includes an indication as to whether or not and/or when more-reliable data is expected to be available for display.

In some embodiments, allocation of data to different telemetry subsystems comprises assigning a set of data for transmission to one telemetry subsystem. The set of data may be ordered according to priority with most-important data first. A time limit may be pre-set for completing transmission of the set of data. If it becomes apparent that transmission of the set of data will not be completed by the time limit then some of the set of data may be redirected for transmission on an alternative telemetry subsystem. In addition or in the alternative, a minimum bit-rate may be set for transmission of the set of data. If the minimum bit rate is not met by the assigned telemetry subsystem then some of the set of data may be redirected for transmission on the alternative telemetry system.

In one embodiment of the concurrent shared telemetry mode, one telemetry unit 46A, 46B or 75, 85 will transmit its telemetry signal regardless of whether the other telemetry unit 46A, 46B or 75, 85 is functioning or has failed. As described in more detail herein, a downhole system may be configured to switch telemetry modes in response to receipt of a downlink command from a surface operator, such as a command to switch from the concurrent shared mode to the MP-only mode when the operator detects that the EM telemetry unit 75 has failed. In another embodiment, a telemetry unit 75, 85 which has failed or is not functioning properly is programmed to send a signal over data bus 98. The other telemetry unit 75, 85 which is still functioning may, upon receipt of this signal, be configured to change to an operating mode in which it obtains measurement data from sensors (e.g. sensors 54, 56, 58, 62, 64, 66, 94) which were supposed to be obtained by the failed telemetry unit 75, 85 in addition to the measurement data the functioning telemetry unit has already been configured to obtain.

In another example of a concurrent mode, EM and MP telemetry units 46A, 46B or 75, 85 may be configured to transmit only some of the same measurement data (e.g. toolface data). This can be useful when it is desirable to verify the accuracy of certain data. In some embodiments the respective EM and MP telemetry units are configured to obtain the same measurement data at the same time, i.e. to synchronize their reading of the measurement data from the relevant sensors.

In one example of a telemetry mode, survey data (e.g. survey data acquired by one or more sensors 54, 56, 58, 62, 64, 66, 94) can be transmitted by EM telemetry unit 46A or 75, wherein the survey data is encoded into an EM telemetry signal and transmitted by the EM telemetry unit 46A or 75 during a drill string idle time, during a period of no mud flow and no drill string rotation. After the survey data has been transmitted, the EM telemetry unit 46A or 75 may power off and other measurement data may be transmitted by MP telemetry unit 46B or 85.

Data Unit Splitting e.g. Byte Splitting

Another type of concurrent shared mode transmits parts of individual data elements using different telemetry units. This approach can help to ameliorate the problem that data rates of all telemetry modes can become very low when drilling deep wells. Consider, for example the case where a telemetry system takes 5 seconds per bit to transmit certain data to the surface from a certain downhole location and the data in question is 12 bits. In this example, it will take at least 5×12=60 seconds to transmit the data using the telemetry system. The data may, for example, be a value of a single sensor reading.

If a second telemetry system is available then the latency (time between the sensor reading being made and the sensor reading being available at the surface) can be reduced by transmitting some of the bits using each of the telemetry systems. For example, if the second telemetry system can also transmit data from the downhole location at a rate of 5 seconds per bit then each telemetry system may be configured to transmit 6 bits of the data. In this mode, the time taken to transmit the data may be reduced to 5×6=30 seconds. Thus, splitting a single data element between two or more telemetry channels (e.g. between an EM telemetry channel and an MP telemetry channel) may result in dramatically reduced latency which may, in turn, provide closer to real-time control over the drilling operation. This mode may be called a "concurrent shared byte-splitting" mode (even though the data units being split are not necessarily 8-bit bytes).

In some embodiments a data unit being split is a single number (e.g. a binary number encoding one or more parameter values). In some embodiments the data unit being split comprises an error detecting and/or error correcting code. For example one or more check bits. For example, the data unit may comprise a parity bit, a number of CRC (cyclic redundancy check) bits, or the like in addition to data bits. In an example embodiment a data unit comprises 7 data bits representing data such as toolface data and 3 CRC bits for a total of 10 bits. In some embodiments the data unit comprises 33 or fewer bits. In some embodiments the data unit comprises 7 to 15 bits. In some embodiments an entire data unit or element is required to effectively use the data unit and/or to check the data unit for errors and/or to correct errors in the data unit.

In some embodiments a concurrent shared byte-splitting mode is used to transmit toolface data. In some embodiments toolface data is transmitted in a manner that varies with available data rates. For example, while a first telemetry subsystem (e.g. an MP subsystem) can transmit toolface data at a high rate, then high resolution toolface data may be transmitted using the first telemetry subsystem. If the available data rate drops below a threshold then the high resolution toolface data may be split, some bits of the toolface data may be transmitted using the first telemetry subsystem and other bits of the toolface data may be sent using a second telemetry subsystem (e.g. an EM subsystem). If the data rate drops still further then lower resolution toolface data may be transmitted (again splitting the bits between the first and second telemetry subsystems). In one example embodiment, the high resolution toolface data is 11 bits and the low resolution toolface data is 7 bits. In either case, some data error detecting/correcting bits may also be provided.

In some embodiments the bits of a data unit are allocated among telemetry subsystems in proportion to the bit rate at which the telemetry systems can operate. For example, if from a certain location an EM telemetry subsystem is operable to transmit data at a rate of 5 bits every 10 seconds and an MP telemetry subsystem is operable to transmit data at a rate of 10 bits every 10 seconds then, to minimize latency of a 12-byte data unit, 8 bytes may be transmitted by way of the MP subsystem and 4 bytes may be transmitted by way of the EM telemetry subsystem.

To facilitate a concurrent shared byte-splitting mode a controller in a downhole system may be configured to obtain a sensor reading and to forward parts of the sensor reading to each of two or more telemetry systems for transmission. As another example, the controller may be configured to forward the entire sensor reading to each of the plurality of telemetry systems and each telemetry system may be configured to transmit a corresponding portion of the sensor reading. As another example, each telemetry system may be configured to obtain the sensor reading and to transmit a corresponding part of the sensor reading.

A range of schemes may be applied to allocate specific bits of a data unit among telemetry subsystems. For example, the bits may be allocated using a round robin scheme such that each of a plurality of telemetry subsystems is allocated one bit or one group of two or more bits in turn. For example, with two telemetry subsystems operating, a first one of the telemetry subsystems may transmit the bits for every odd bit position in the data unit and a second one of the telemetry subsystems may transmit the bits for every even bit position of the data unit.

As an alternative, high-order bits of the data unit may be transmitted by the first telemetry subsystem and low-order bits may be transmitted by the second telemetry subsystem. In this case, the reliability of the data transmissions of the telemetry subsystems may optionally be used to determine which telemetry subsystem is used to transmit the higher order bits of the data unit and which telemetry subsystem is used to transmit the lower-order bits of the data unit. For example, the more reliable (lower error rate) telemetry subsystem may be used to transmit the lower order bits in cases where the higher order bits are less likely to change between subsequent sensor readings.

The allocation of bits of certain data units among a plurality of telemetry subsystems may be done according to a predetermined configuration profile (as discussed below). In other embodiments, allocation of bits of certain data units among telemetry subsystems may be set up using downlink commands or set up automatically at a downhole system (which may then communicate this bit allocation to surface equipment using one or more of the telemetry systems). The surface equipment is configured to receive, decode and combine the bits to recover the transmitted data.

In some embodiments, one or more of the telemetry systems is configured to transmit symbols that each represent N-bits (where N is less than the size of a data unit to be transmitted) and the downhole system is configured to send N bits of the data unit using the telemetry system and to send the rest of the data unit using one or more other telemetry systems.

By being able to operate in a number of different telemetry modes, downhole systems as described in the present examples offer an operator flexibility to operate the system in a preferred manner. For example, the operator can increase the transmission bandwidth of the telemetry tool by operating in the concurrent shared mode, since both the EM and MP telemetry systems are concurrently transmitting telemetry data through separate channels. Or, the operator can increase the reliability and accuracy of the transmission by operating in the concurrent confirmation mode, since the operator has the ability to select the telemetry channel having a higher confidence value. Or, the operator can conserve power by operating in one of MP-only or EM-only telemetry modes. Or the operator can reduce latency for transmission of individual parameters or other blocks of information by operating in a 'byte-splitting' mode.

Further, the operator can choose the MP-only or EM-only modes based on which mode best suits the current operating conditions; for example, if the reservoir formation requires an EM telemetry system to transmit at a very low frequency in order for an EM telemetry signal to reach surface, the resulting low data rate may prompt the operator to select to transmit using the MP-only mode. Conversely, when there is no mud flowing (e.g. while air drilling), the operator can select the EM-only mode to transmit telemetry data. The flexibility of downhole systems according to preferred embodiments described herein facilitates configuring such downhole systems to promote benefits such as: faster data communication, better energy efficiency, more reliable data communication; and/or more flexible data communication.

Testing Modes

Some embodiments provide testing modes for different telemetry systems. In such a testing mode a telemetry system may be operated to transmit predetermined data for receipt and analysis at the surface.

By offering a variety of different telemetry modes in which telemetry signals can be transmitted by the telemetry apparatus 50 and received by the surface transducer 26, the telemetry system offers an operator great operational flexibility. The telemetry apparatus 50 can be instructed to transmit at the highest data rate available under current operating conditions; for example, if the telemetry apparatus 50 is at a location that the EM telemetry unit 75 must transmit an EM telemetry signal at a very low frequency in order to reach surface and which results in a data rate that is lower than the data rate of the MP telemetry unit 85, the surface operator can send a downlink command to instruct the telemetry apparatus 50 to transmit using the MP telemetry unit 85. Further, the telemetry apparatus 50 can be instructed to transmit in one telemetry mode when the operating conditions do not allow transmission in the other telemetry mode; for example, the telemetry apparatus 50 can be instructed to transmit in the EM-only telemetry mode when no mud is flowing. Further, the telemetry apparatus 50 can be operated in a concurrent shared mode effectively doubling the number of telemetry channels thereby increasing the overall data transmission bandwidth of the telemetry apparatus 50. Further, the reliability of the telemetry apparatus 50 can be increased by transmitting in the concurrent confirmation mode and selecting the telemetry data having the highest confidence value. Further, if one telemetry subsystem fails or is not useable in current conditions then another telemetry system may be used to allow continued drilling.

Surface Equipment Synchronization

To decode transmissions received from a downhole system, surface equipment needs to know the way in which the data has been encoded. This may be done in a variety of ways. For example:

In some embodiments, the specific data to be encoded by the downhole system and the way in which that data is encoded is predetermined. The downhole system is configured to transmit the data using the predetermined scheme and the surface equipment is configured to decode the data using knowledge of the predetermined scheme.

In some embodiments different groups of data are transmitted by the downhole system according to different predetermined schemes. Surface equipment may be configured to decode the data and to determine which scheme has been used for each set of received data based on information in the data (e.g. a frame header, an ID code, or the like).

Encoding schemes may be selected and/or set up after the downhole system has been deployed. This may be done, for example, when the downhole system is relatively near to the surface and so reliable relatively high bandwidth communication is available. In some such embodiments, telemetry information such as one or more aspects of data selection and/or encoding methods for data and/or telemetry mode and/or data ordering may be determined at the downhole system and transmitted to the surface equipment. This transmission may be done using a predetermined protocol. For example, the surface system may be configured to wait for a binary status message that indicates how the surface system should decode received telemetry transmissions. The telemetry information may be subsequently used by the surface equipment to decode telemetry data received by the surface equipment.

In some embodiments, a single telemetry subsystem (e.g. an EM telemetry subsystem) may be used to transmit telemetry information for all or a group of telemetry subsystems. In some embodiments the downhole system may determine the telemetry information based in part on the operational status and availability of telemetry subsystems.

In some embodiments, one telemetry subsystem may be used to transmit telemetry information for another telemetry subsystem and vice versa. For example, an EM telemetry subsystem may be used to transmit to surface equipment telemetry information required for decoding telemetry data from a downhole MP telemetry subsystem and an MP telemetry subsystem may be used to transmit to surface equipment telemetry information required for decoding telemetry data from a downhole EM telemetry subsystem.

The downhole system may transmit status messages that indicate changes in telemetry modes, what data is being transmitted, how that data is formatted, whether byte-sharing is occurring, and/or other data required or useful for decoding the telemetry data at the surface.

In an example embodiment an EM telemetry system is used to transmit information regarding the encoding of data transmitted by an MP telemetry system. This may significantly reduce the amount of time required to start receiving and decoding data by way of the MP telemetry system. In the case where there are a plurality of available EM telemetry channels (e.g. two EM telemetry systems are downhole) optionally one EM telemetry channel may be dedicated to providing telemetry information for other telemetry channels (e.g. for an MP telemetry channel and/or for another EM telemetry channel). The control information may be encoded and transmitted, for example, according to a predetermined format.

Telemetry information in any embodiment may comprise, for example, an index identifying a predetermined configuration profile, data indicating an encoding scheme, data indicating a telemetry mode, and/or other data that provides information necessary or useful for detecting and/or decoding at the surface equipment received telemetry transmissions.

Mode Switching

A downhole system (e.g. 40, 40A, 50) may be caused to shift among the available modes in various ways. These include:

receiving a downlink command from surface equipment;

receiving user input prior to deployment of the downhole system;

automatically changing modes in response to detected drilling status;

automatically changing modes in response to one or more measurements collected by sensors of the downhole system;

automatically changing modes in response to the status of the downhole system (e.g. power availability, failure of a component, activation or deactivation of one or more sub-systems of the downhole system—for example, an EM telemetry system, an MP telemetry system etc.). Deactivation of a subsystem of a downhole system may be due to, for example, damage, malfunction, an automated process, user instruction, intentional or unintentional power loss, conditions that impair the effectiveness of the telemetry system and/or any other reason);

automatically changing modes in response to conditions affecting one or more telemetry systems (e.g. excessive current draw for an EM telemetry system, insufficient flow for an MP system);

automatically changing modes at predetermined times; and, combinations of these.

In some embodiments the downhole system may be configured to perform telemetry in a certain way or ways by loading one or more configuration profiles at the surface. The tool may then operate in one configuration for an entire downhole deployment. In other embodiments the downhole system may be configured to switch among two or more different modes in response to commands from the surface (whether transmitted by a downlink telemetry system or through predetermined patterns of operation of the drill string and/or drilling fluid system) and or automatically in response to certain events and or conditions.

In some embodiments a downhole system is loaded with configuration information that specifies each of a sequence of operating modes in a predetermined order. In such embodiments a very short command may suffice to control the downhole system to switch to a next one of the sequence of modes.

In some embodiments, downlink commands are provided by downlink EM telemetry.

In some embodiments, switching among different modes is achieved by switching among corresponding configuration profiles which specify the attributes of the different modes as described in more detail below.

Where a telemetry subsystem is reconfigured to transmit data in a different way (e.g. to change an encoding scheme, the format in which data is presented in telemetry signals, etc.) the surface equipment must also be reconfigured to properly decode received telemetry signals. Given the problems of communicating with a downhole system at significant depths there can be cases where it is unknown whether a downlink command has been received and acted on by a downhole system. In some embodiments, when a downhole system reconfigures one telemetry subsystem, the downhole system is configured to transmit confirmation information on another telemetry system that confirms the change. The confirmation information may optionally include information that specifies or identifies the new mode. For example, when an EM system is reconfigured to a lower frequency and/or a different number of cycles per bit and/or a different encoding scheme, information may be transmitted to the surface equipment by an MP telemetry subsystem that confirms that the EM telemetry subsystem is now reconfigured. Similarly, an EM telemetry subsystem may be used to send confirmation information confirming that an MP telemetry subsystem has been reconfigured.

EXAMPLE APPLICATIONS OF MODE SWITCHING

Example 1

In one example embodiment, a downhole system 40, 40A, 50 is configured (e.g. by suitable software) to start operating initially using a selected telemetry mode, and to change to a different telemetry mode in response to a downlink command from surface equipment.

Example 2

In another example embodiment, in a first mode EM telemetry system 46A and MP telemetry system 46B are both active and available for transmission. The first mode may be a 'concurrent shared' mode in which EM telemetry system 46A is configured to transmit the most recent measurements from direction and inclination system 62, together with measurements from one or more of the remaining sensors. In the first mode MP telemetry system 46B may be dedicated solely to the transmission of the most recent measurements from gamma sensor 64. In the first mode telemetry systems 46 transmit data independently so as to obtain a corresponding increase in the total bandwidth of telemetry system 40.

Further, in this example, control system 42 may be configured such that, if MP telemetry system 46B is deactivated or if an appropriate instruction is received from the surface, then control system 42 may switch to a second "EM-only" mode. Control system 42 may send a status message prior to switching modes. The status message informs surface equipment of the change in mode.

In the EM-only mode the downhole system may be configured to cause EM telemetry system 46A to transmit the most recent measurement from gamma sensor 64 on every other frame (e.g. on odd numbered frames), leaving the remaining (e.g. even numbered frames) to be used for other desired data. In the alternative, the second mode may configure telemetry systems 46 to operate independently such that, in the event that one telemetry system 46 is deactivated, the remaining telemetry system(s) 46 continue to operate without changing their behaviour. A change in behaviour may still be caused by, for example, transmission of an instruction to change configuration profiles from the surface to the bottom hole assembly.

Control system 42 may, in response to certain sensor readings disable or suspend operation of one or more telemetry systems. For example the system may include a sensor connected to measure current of an EM signal. If the current exceeds a threshold then the EM system may be shut down or placed in a non-transmitting mode. In this event the system may automatically switch over to an "MP-only" configuration profile. The MP only profile may both specify that the EM system should be shut off or inhibited and specify data to be transmitted by MP telemetry in a specific sequence.

Other sensor readings that may prompt a change in configuration profile may, for example, include failing to detect MP pressure pulses at a downhole pressure sensor or receiving pressure sensor readings that indicate that a valve used for generating MP pulses is jamming or otherwise malfunctioning. Control system 42 may be configured to switch over to an "EM only" configuration profile in response to detecting such sensor readings. The EM only profile may both specify that the MP system should be shut off or inhibited and specify specific data to be transmitted by EM telemetry in a specific sequence.

In some embodiments, control system 42 may automatically change profiles in response to such a sensor reading. In some embodiments, such a sensor reading may result in the transmission of one or more "status" frames to the surface indicating the sensor reading; this enables a surface operator to respond with an instruction to change configuration profiles.

In some embodiments a system may be configured to use MP telemetry only and to switch to EM telemetry in the event that the MP system is not able to function properly (either because of a malfunction or due to downhole conditions being unsuitable for MP telemetry). More generally, in some embodiments a system may be configured to use a first telemetry mode only and to switch to another telemetry mode if the first telemetry mode is not able to function at at least a minimum performance level.

Example 3

In another example, the downhole system (or surface equipment) is configured to periodically determine the cost per bit of data transmitted of a plurality of available telemetry subsystems. The cost may be measured in terms of energy consumption and/or efficiency (e.g. a cost penalty may be applied to a telemetry subsystem that has a slow data rate or is unreliable). Based on the cost information the downhole system may automatically be switched between different operating modes (e.g. an EM-only mode, an MP-only mode, any of various shared modes which may differ in the total amount of data to be transmitted and/or the allocation of that data between an EM telemetry subsystem and an MP-telemetry subsystem).

As another example, a user of the downhole system may pay different rates for data transmitted by different telemetry subsystems. Based on economic cost information the downhole system may be switched manually or automatically between different operating modes. For example, the downhole system may automatically switch to a lower-cost telemetry mode or switch an allocation of data so that less data is sent on a higher-cost telemetry mode when a budget has been reached for transmitting data using the higher-cost telemetry mode. In some embodiments the higher-cost telemetry mode is an EM telemetry mode.

Configuration Profiles

In some embodiments, configuration profiles are used to facilitate specifying the particular characteristics of different operating modes and to facilitate switching among two or more different modes. A configuration profile comprises information that may be stored electronically. The information may comprise software instructions for execution by one or more controllers and/or data such as flags, parameter values, settings, or the like that can be applied to alter the operation of a downhole system. Telemetry apparatus 50 may contain a set of configuration profiles stored in one or more data stores. The configuration profiles may configure many aspects of the operation of apparatus 50. The operation of apparatus 50 may then be changed by switching from one configuration profile to another. In some embodiments a configuration profile comprises separate sets of instructions and/or data for each of a plurality of controllers. Each controller may operate as determined by the corresponding set of instructions and/or data.

Configuration profiles may be stored in data storage 204, or in some other memory or location accessible to one or more controllers of control system 42.

For example, different configuration profiles may respectively configure apparatus 50 to operate in: 1) an MP-only telemetry mode, wherein only the MP telemetry unit 85 is used to send telemetry signals via mud pulses; 2) an EM-only telemetry mode, wherein only EM telemetry unit 75 is used to send telemetry signals via EM signals; 3) a concurrent shared telemetry mode wherein both EM and MP telemetry units 75, 85 are used concurrently to transmit data, and wherein some of the data is sent by EM telemetry signals and the rest of the data is sent by MP telemetry signals; and 4) a concurrent confirmation telemetry mode, wherein both EM and MP telemetry units 75, 85 are used to transmit the same data. Apparatus 50 may be placed into any one of these modes by making the corresponding configuration profile active.

A configuration profile may include executable instructions and/or data which are collectively executed and/or interpreted by apparatus 50 to cause apparatus 50 to perform in a manner specified by the configuration profile. The ability to change the operation of apparatus 50 using electronically storable configuration profiles enables apparatus 50 to be readily reconfigured to work in a wide range of applications.

In some embodiments configuration profiles may comprise software and/or settings to be executed/interpreted by specific ones of controllers 52, 60, 70, 80, and 90. Switching between different configuration profiles may involve executing a routine which makes software and/or settings associated with a new configuration profile active. Different configuration profiles may, inter alia, specify different telemetry modes. Each of the configuration profiles may cause telemetry apparatus 50 to generate telemetry signals according to a corresponding selected operating configuration specified by instructions and/or settings in the configuration profile. The configuration profiles may, for example, specify factors such as:

the telemetry mode in which telemetry apparatus 50 may operate (e.g. which telemetry systems will be used, what data will be acquired and transmitted on each telemetry system);

the type(s) of message frames to be sent in the telemetry transmission(s);

the composition of the message frame(s), which may include the data type, timing, and/or order of the data in each message frame, specification of any error-correction protocol; and one or more modulation schemes to be used to encode the data into telemetry signals.

A set of configuration profiles may include a plurality of configuration profiles which all specify the same general telemetry mode (e.g. MP-only or EM-only, etc.). Each configuration profile for that telemetry mode may specify different operating parameters for that telemetry mode. For example, in an EM-only telemetry mode, one configuration profile can be provided with instructions for the telemetry apparatus 50 to encode measurement data using one type of modulation scheme (e.g. QPSK) and another configuration profile can be provided with instructions for the telemetry apparatus 50 to encode measurement data using a different type of modulation scheme (e.g. FSK). Or, different configuration profiles can provide instructions for the EM telemetry unit 75 to transmit telemetry signals at different power outputs wherein a suitable configuration profile is selected depending on the downhole location of the telemetry apparatus 50 and the accompanying attenuation of the earth formation that must be overcome in order for the EM transmission to reach surface.

In some embodiments a default set comprising a plurality of configuration profiles is stored in system 50. For some jobs the configuration profiles included in the default set may be adequate.

A custom set of configuration profiles may be downloaded onto telemetry apparatus 50, e.g. when telemetry apparatus 50 is at surface. Loading configuration profiles into apparatus 50 may be performed by way of a wired or wireless connection to a host system such as a computer or the internet or a data store in which the desired configuration profiles are available. For example, a connection to a host computer may be made via a USB cable connected from the computer to an interface port connected to data bus 98 by a suitable USB interface. As another example, configuration profiles may be loaded into apparatus 50 by inserting one or more memory cards or other media containing the configuration profiles into suitable interfaces provided by apparatus 50.

In some embodiments, a set of configuration profiles may be loaded for each job. The number of configuration profiles loaded into system 50 for any particular job may depend on the expected operations the rig will perform during the job. Once the operator determines which configuration profiles should form the set of configuration profiles to be downloaded onto the telemetry apparatus 50, a download program on the download computer may be run to download the selected configuration profiles into apparatus 50.

In some embodiments the configuration profiles may each comprise a plurality of parts which are designed to be applied by different controllers. For example, a part of a configuration profile may specify features for EM telemetry transmission and may be intended to be applied by EM controller 70. Another part of a configuration profile may affect power management and may be intended to be applied by power controller 90 and so on. In some embodiments, apparatus 50 has separate memories or memory areas for storing software and/or settings for different ones of controllers 52, 60, 70, 80, 90 of the telemetry apparatus 50. In such embodiments the download program may determine which portion of each configuration profile should be stored for access by each controller and may then save the different parts of each configuration profile to the appropriate data storage locations in apparatus 50. For example, instructions in the configuration profile relating to operation of the EM telemetry unit 75 may be downloaded only to the memory of the EM controller 70.

When a configuration profile is selected, each affected controller executes the applicable software instructions and/or reads the applicable settings. These instructions/settings cause the controller to carry out its functions in the manner specified by the configuration profile. For example, when EM controller 70 executes a configuration profile portion stored on its memory, the configuration profile may include instructions for whether the EM telemetry unit 75 needs to be active for the telemetry mode specified in the configuration profile. If the specified telemetry mode requires the EM telemetry to be active (e.g. the specified telemetry mode is EM-only or a combined mode), the EM controller 70 may be configured to read measurements taken by one or more sensors (e.g. one or more of sensors 54, 56, 58, 62, 64, 66, 94) specified in the configuration profile, encode the measurement data into an EM telemetry signal using a modulation scheme specified in the configuration profile, and cause the components of the EM telemetry unit 75 to transmit the EM telemetry signal according to message frame properties (e.g. type, composition, order, timing) specified in the configuration profile.

In some embodiments, a user of drill rig 10 may cause surface transceiver 26 to transmit one or more control signals to downhole system 20, and in particular to a telemetry system 40 of downhole system 20, instructing telemetry system 40 to select, add, remove, and/or alter a configuration profile, thereby causing the behaviour of telemetry system 40 to change the next time the configuration profile is made active. This facility may be applied, for example, to correct errors in a configuration profile, compensate for problems caused by failure of components and/or adverse telemetry conditions, and/or provide information required to address a problem encountered in drilling.

Switching Among Configuration Profiles

Figure 7:
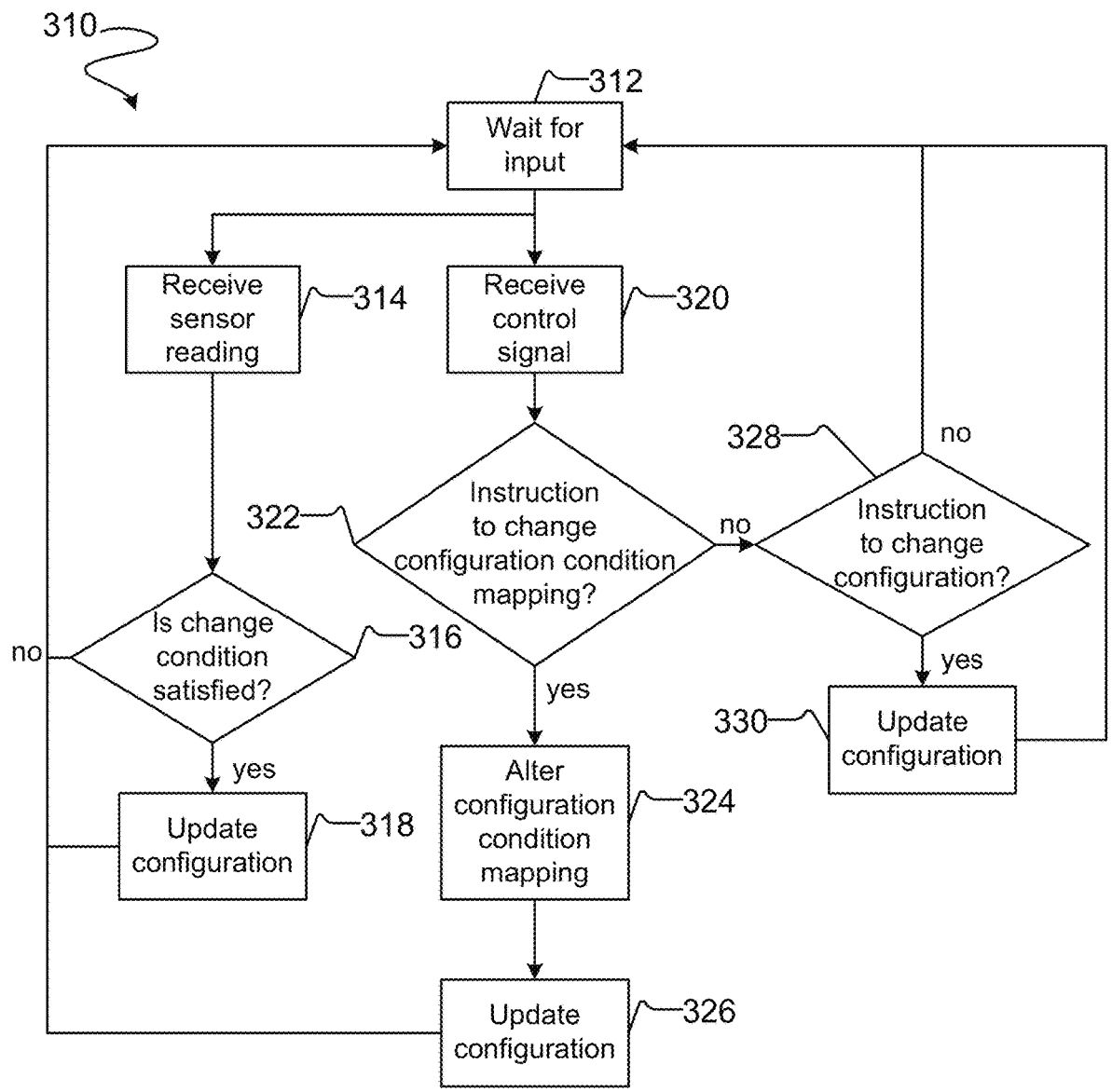
FIG. 7 is a flowchart diagram of an example method for updating a telemetry configuration system according to FIG. 6.

FIG. 7 shows an example method 310 for changing the currently active configuration profile of a telemetry system 40. Block 312 is the system state while no change is being undertaken or considered. When a sensor reading is taken, the method goes to block 314 and receives the sensor reading. The system then considers at block 316 whether a change condition has been satisfied. A change condition could be, for example, receiving a sensor reading from EM telemetry system 46A indicating that the scale current is exceeding a threshold. For the sake of simplicity, and for the purpose of FIG. 7, detecting that a system, such as a telemetry system 46, has become active or inactive is included as a type of "sensor reading".

If receiving the sensor reading causes all of the change conditions associated with an inactive configuration profile to be satisfied, then the method moves to block 318, where the currently active configuration profile is changed to be the configuration profile associated with this satisfied conditions. After changing to the new configuration profile, or if no inactive configuration profile had all of its conditions satisfied, the method returns to block 312.

If a control signal is transmitted to telemetry system 40, the method goes to block 320 to receive the control signal, and then goes to decision block 322. If the received control signal encodes instructions to add, delete or alter a configuration profile (which may include adding, deleting or altering the change conditions associated with any given configuration profile), method 310 proceeds on to block 324 where those additions, deletions or alterations are incorporated by telemetry system 40. Such incorporation may be accomplished, for example, by changing values in a memory, device, structure or service (such as data storage 204) where configuration profiles and their associated change conditions are stored.

Method 310 then moves to block 326 where the current state of the system is re-evaluated so as to determine which configuration profile should be active. This process may involve, for example, comparing all of the most recently measured sensor readings against the current set of change conditions, together with the current activity or inactivity status of the various systems of telemetry system 40, and any other information used to determine the currently active configuration profile. Method 310 then returns to block 312.

If in block 322, the instruction was not one to add, delete or alter a configuration profile, then method 310 moves to block 328, where telemetry system 40 determines whether the controller signal encodes instructions to change the currently active configuration profile. If it does then method 310 moves on to block 330, where the currently active configuration profile is changed to the one indicated by the control signal. Method 310 then moves from block 330, or if the instruction was not changed in configuration from block 328, to block 312. If the configuration was changed in response to an express instructed change to a particular configuration profile, then the telemetry system 40 may, in some embodiments, not change configuration profiles until expressly instructed to do so by a control signal. Telemetry system 40 may also, or alternatively, be configured to continue to assess sensor readings and control signals and change current configuration profiles in response thereto.

Figure 8:
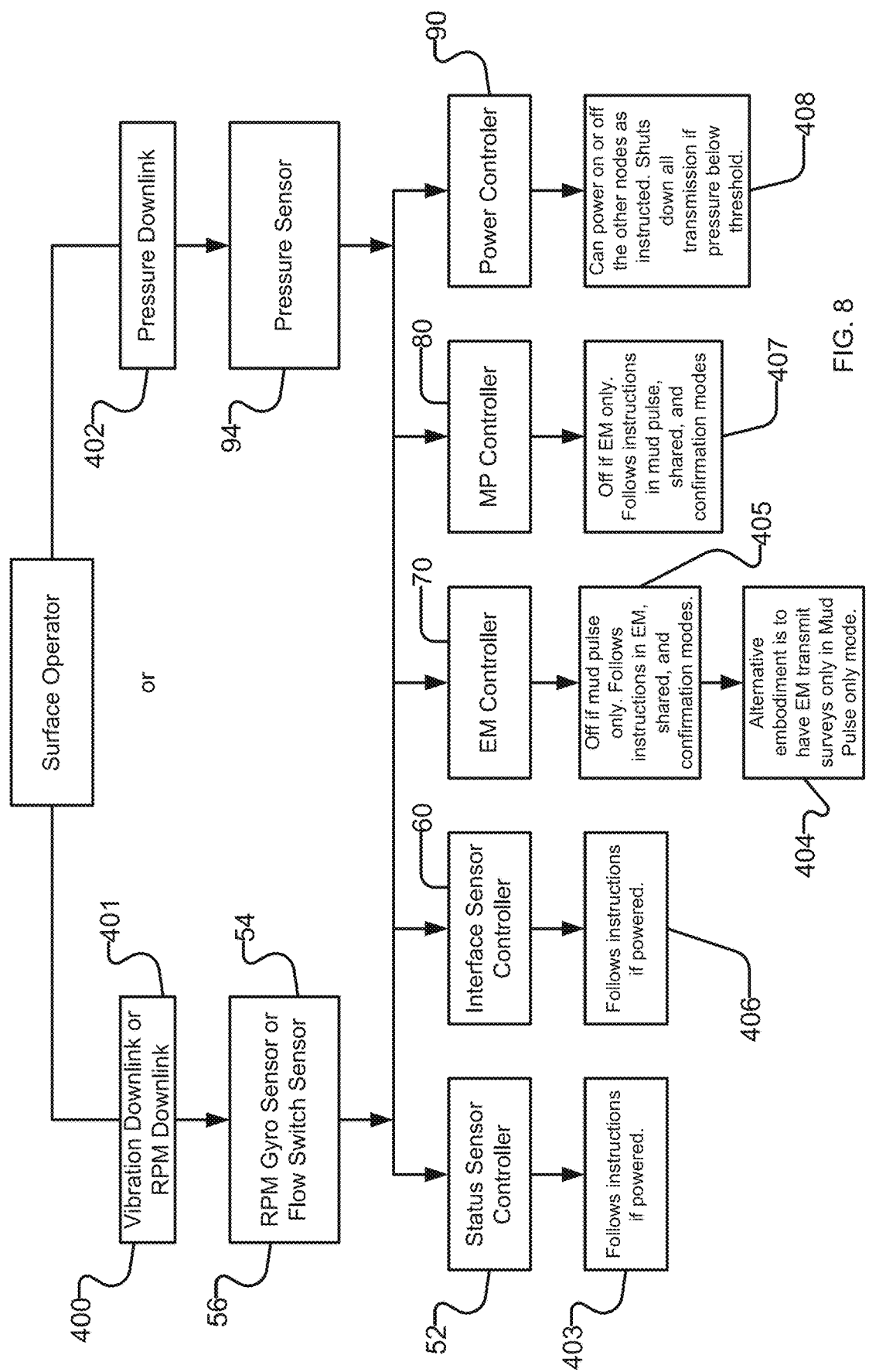
FIG. 8 is a block diagram of a plurality of controllers of a downhole telemetry apparatus and the operations that they may carry out in response to a downlink command.

FIG. 8 shows schematically how telemetry apparatus 50 may be programmed to change its operating configuration in response to a downlink command containing instructions to execute a particular configuration profile. In the illustrated embodiment a surface operator can send a downlink command by vibration downlink 400, RPM downlink 401, or pressure downlink 402 in a manner as is known in art. In other embodiments other types of downlinks may be used. Flow switch sensor 54 and RPM gyro sensor 56 may receive the vibration downlink 400 or RPM downlink 401 commands; the pressure sensor 94 may receive the pressure downlink 402 command. Upon receipt of a downlink command analog signal, the CPU of the status sensor controller 52 or power controller 90 may decode the received signal and extract the bitstream containing the downlink command instructions, in a manner that is known in the art. The status sensor controller 52 or power controller 90 will then read the downlink command instructions and execute the configuration profile portion stored on its memory corresponding to the configuration profile specified in the downlink command, as well as forward the downlink command instructions to the other controllers 52, 60, 70, 80, 90 via data bus 98. Upon receipt of the downlink command instructions, the CPUs of the other controllers 52, 60, 70, 80, 90 may also execute the configuration profile portions in their respective memories that correspond to the configuration profile specified in the downlink command. In particular:

- the status sensor controller 52 may operate its sensors (e.g. shock sensor 58, RPM gyro sensor 56, and flow switch sensor 54) when instructed to do so in the configuration profile (step 403);
- the EM controller 70 may turn off when the configuration profile specifies operation in an MP-only mode or alternatively only transmit survey data in an MP-only mode (step 404), and will operate the EM telemetry unit 75 according to the instructions in its configuration profile portion when the configuration profile portion specifies operation in the EM-only, concurrent shared, or concurrent confirmation mode (step 405);
- the interface sensor controller 60 may operate its sensors (e.g. D&I sensor 62, gamma sensor 64, and D&I backup sensor 66) when instructed to do so in its configuration profile portion (step 406);
- the MP controller 80 may turn off when its configuration profile portion specifies operation in the EM only mode and may operate the MP telemetry unit 85 when its configuration profile portion specifies operation in the MP-only, concurrent shared, or concurrent confirmation mode (step 407); and
- the power controller 90 may power on or power off the other controllers 52, 60, 70, and 80 as instructed in its configuration profile portion, and may otherwise operate to manage power usage in the telemetry apparatus 50 and shut down operation when a measured pressure is below a specified safety threshold (step 408).

FIGS. 9 to 12 schematically illustrate example configuration profiles and the steps performed by each of controllers 52, 60, 70, 80, and 90 upon execution of the instructions of their respective portions of the configuration profiles stored in their respective memories. In these examples, it is assumed that the telemetry apparatus 50 is already operating according to a configuration that requires both EM and MP telemetry units to be active, and the sensors (e.g sensors 54, 56, 58, 62, 64, 66, and 94) receive a downlink command (e.g. a vibration, RPM, or pressure downlink command) to execute a new configuration profile.

Figure 9:
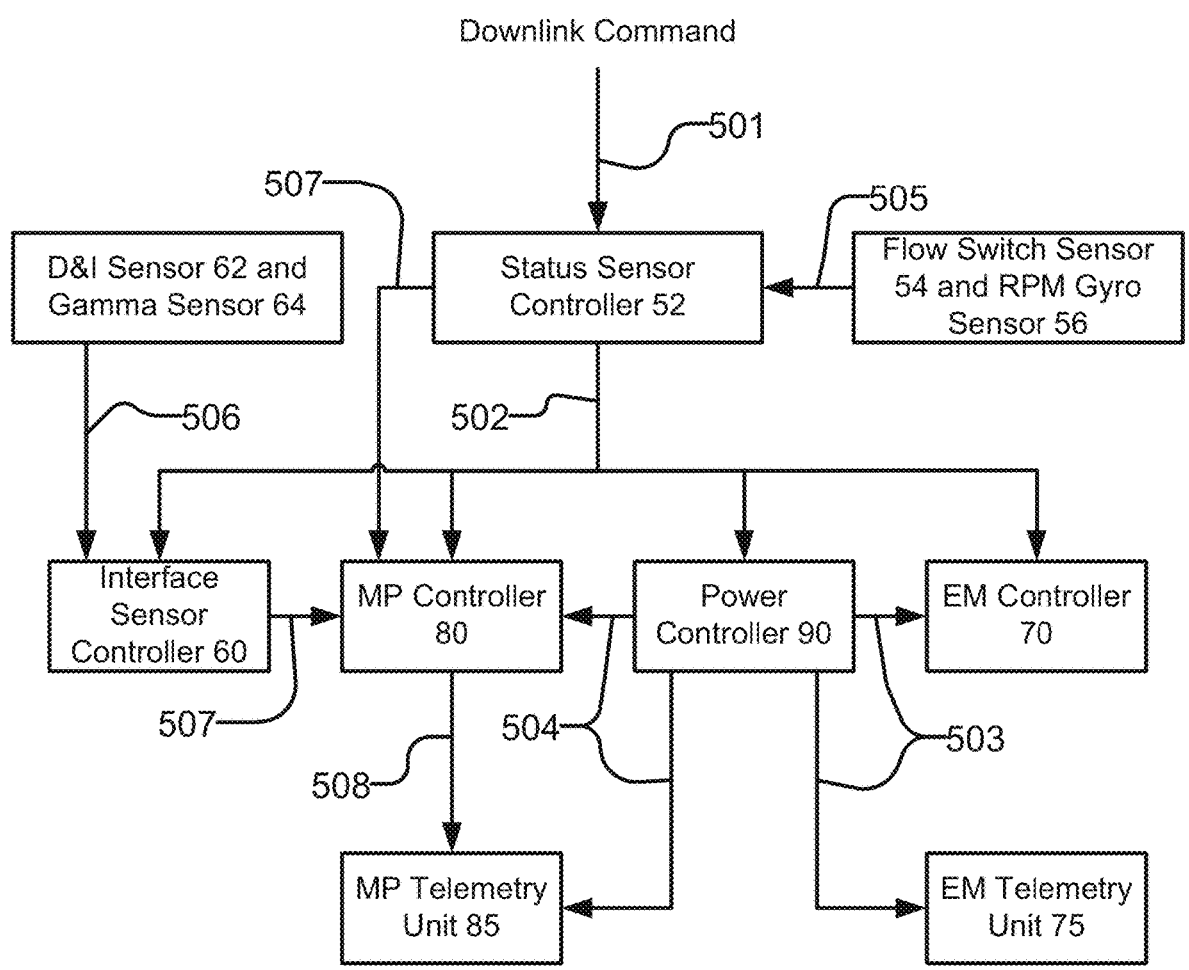
FIGS. 9, 10, 11 and 12 are respectively flow charts illustrating methods that may be performed by a telemetry apparatus while operating in: MP only telemetry mode, EM only telemetry mode, concurrent confirmation telemetry mode, and concurrent shared telemetry mode.

In FIG. 9, a first configuration profile is shown which includes instructions for the telemetry apparatus 50 to operate in an MP-only mode.

Figure 10:
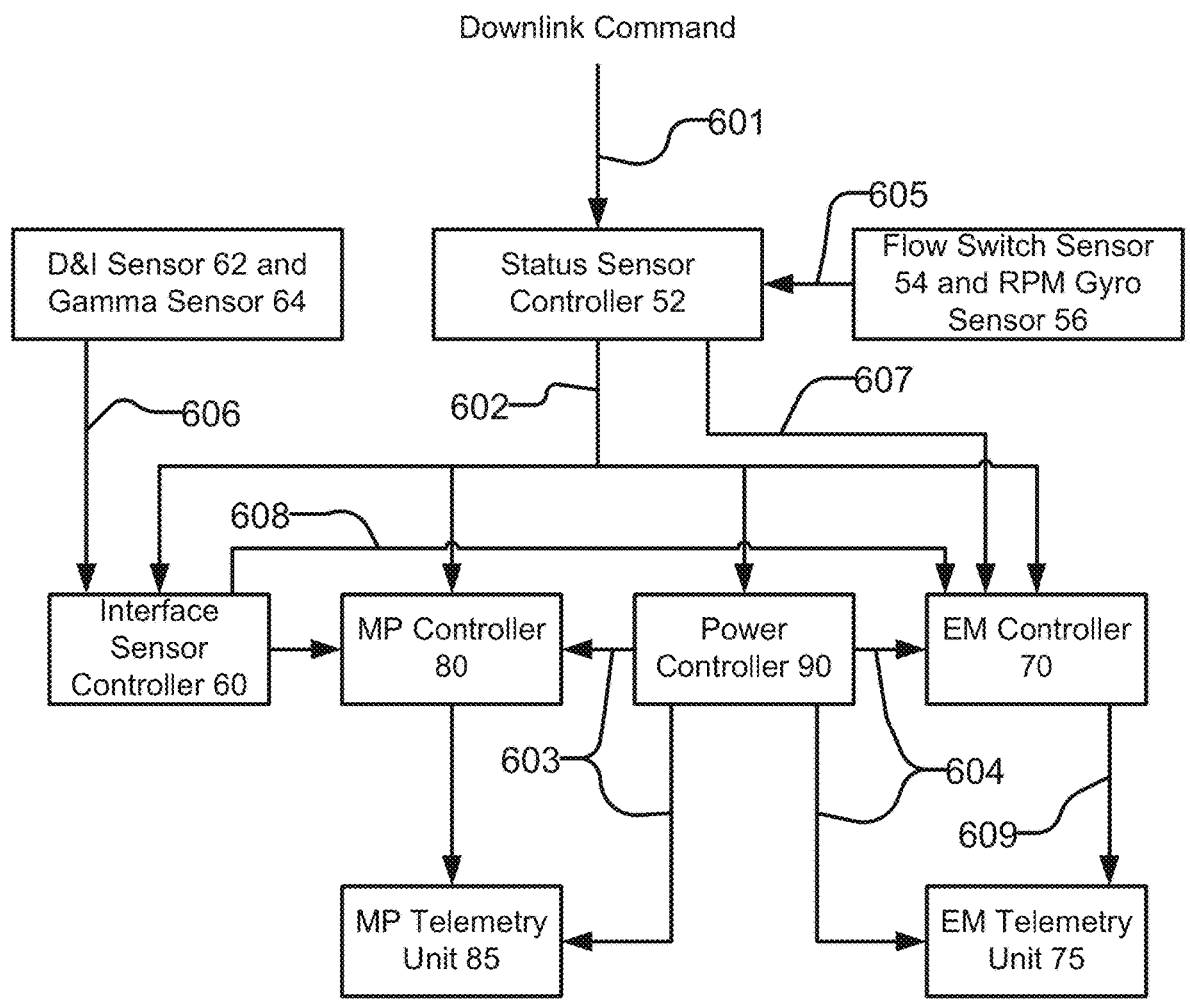

In FIG. 10, a second configuration profile is shown which includes instructions for the telemetry apparatus 50 to operate in an EM-only mode.

Figure 11:
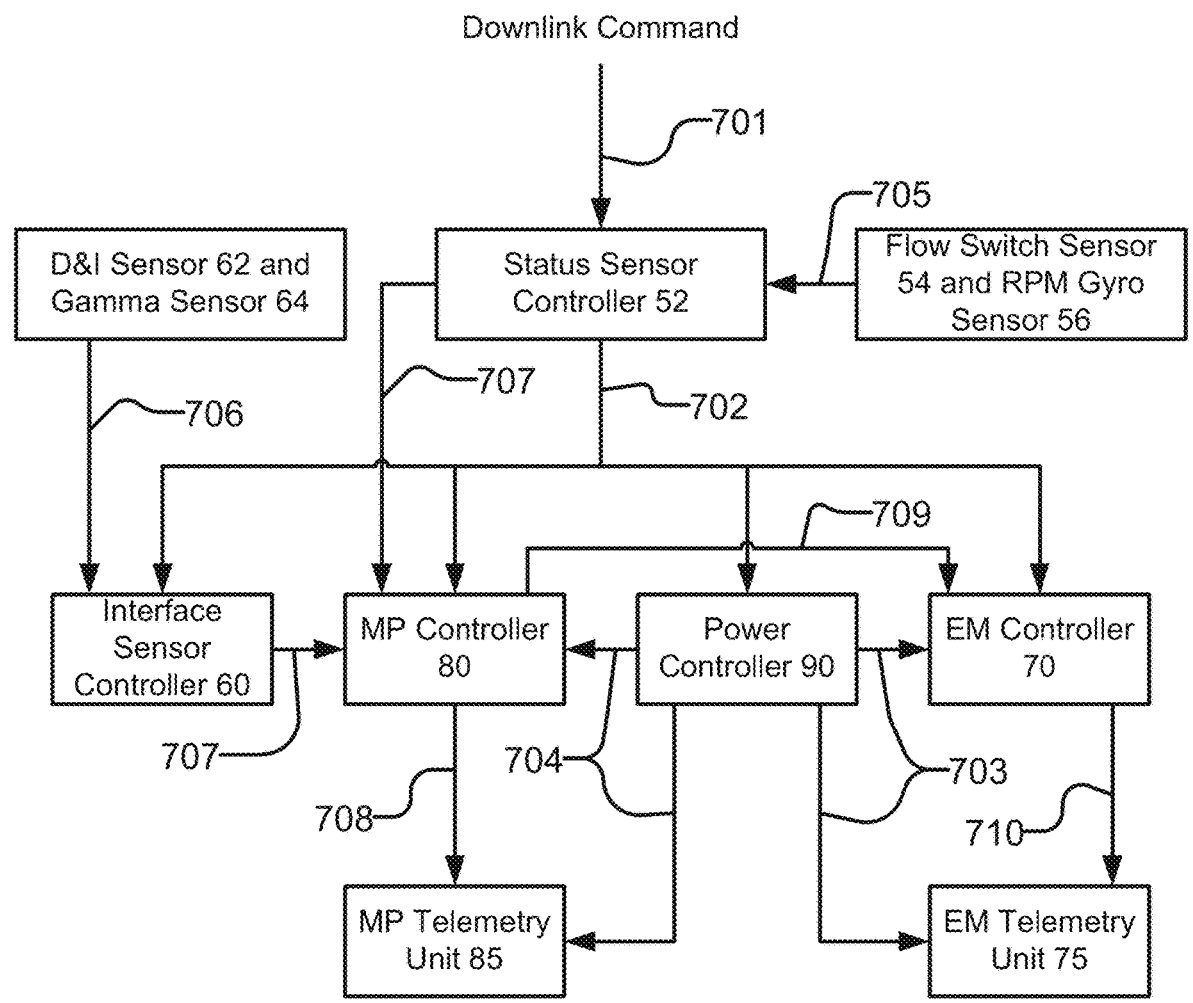

In FIG. 11, a third configuration profile is shown which includes instructions for the telemetry apparatus 50 to operate in a concurrent confirmation mode.

Figure 12:
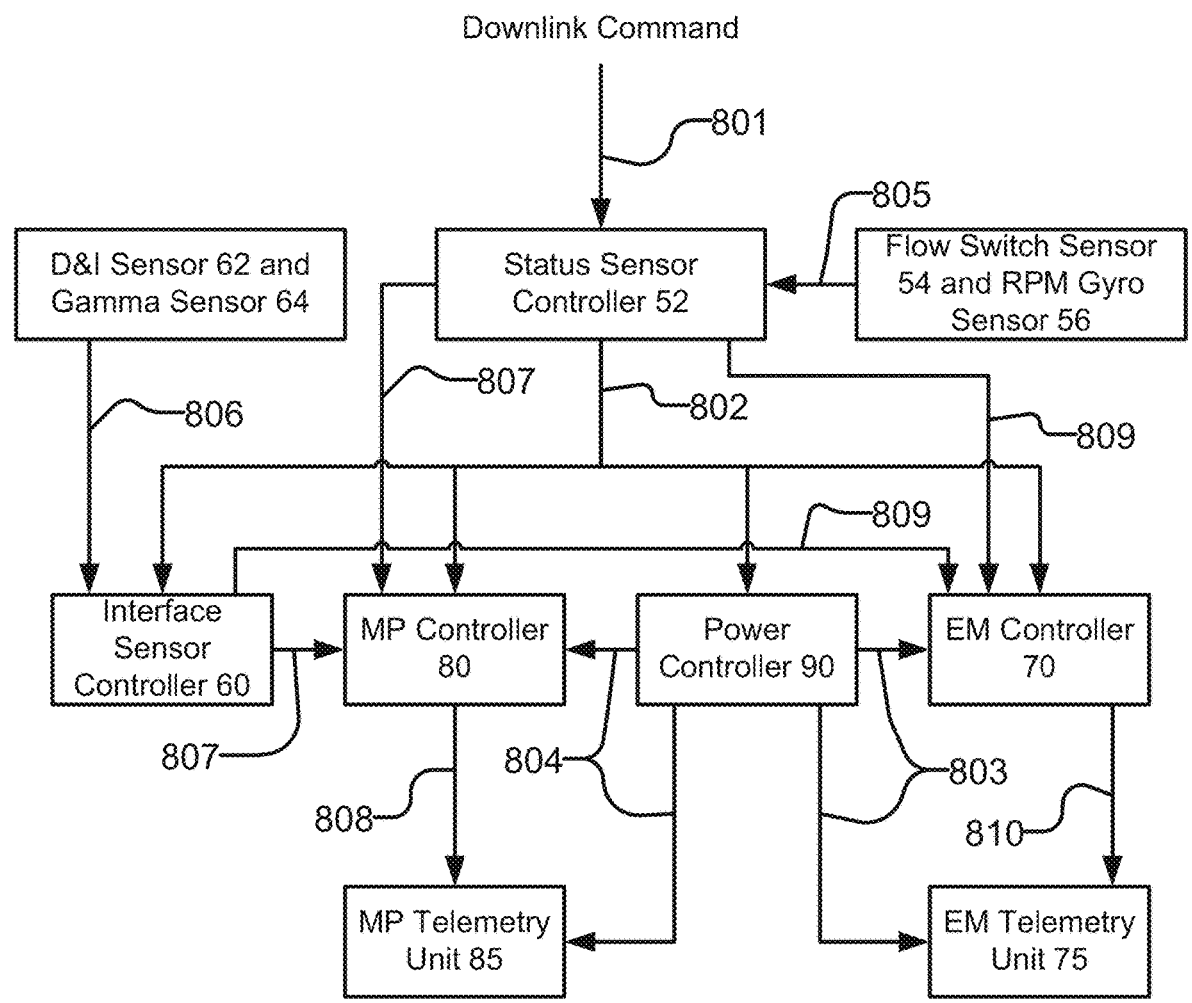

In FIG. 12, a fourth configuration profile is shown which includes instructions for the telemetry apparatus 50 to operate in a concurrent shared mode.

Referring to FIG. 9, the status sensor controller 52 decodes a downlink command signal (step 501) to obtain downlink command instructions to execute the first configuration profile, and forwards these downlink command instructions to the other controllers 60, 70, 80, 90 (step 502). The power controller 90, upon execution of its first configuration profile portion, opens power supply switches to the EM controller 70 and EM telemetry unit 75 to power off these devices (steps 503), and closes power supply switches to the MP controller 80 and MP telemetry unit 85 to power on these devices (steps 504) if these switches are not already closed (in this example they are already closed). The status sensor controller 52, upon execution of its first configuration profile portion, reads flow state and RPM state information from its flow switch sensor 54 and RPM gyro sensor 56, respectively (step 505). The interface sensor controller 60, upon execution of its first configuration profile portion, reads D&I state and gamma state from D&I sensor 62 and gamma sensor 64 (step 506). The MP controller 80, upon execution of its first configuration profile portion, reads the measurement data taken by sensors 54, 56, 62, and 64 (steps 507) and sets the timing of the telemetry transmission based on the flow and RPM measurements, and then operates the MP telemetry unit 85 in the manner specified in its configuration profile portion, which includes encoding the measurement data according to a specified modulation scheme, and having a specified message frame type, composition, and timing, operating the MP motor to operate the pulser assembly 152 to generate mud pulse telemetry signals (step 508).

Referring to FIG. 10, the status sensor controller 52 decodes a downlink command signal (step 601) to obtain downlink command instructions to execute the second configuration profile, and forwards these downlink command instructions to the other controllers 60, 70, 80, 90 (step 602). The power controller 90, upon execution of its second configuration profile portion, opens power supply switches to the MP controller 80 and MP controller (steps 603) to power off these devices, and closes power supply switches to the EM controller 70 and EM telemetry unit 75 to power on these devices (steps 604) if these switches are not already closed (in this example they are already closed). The status sensor controller 52, upon execution of its second configuration profile portion, reads flow state and RPM state information from its flow switch sensor 54 and RPM gyro sensor 56, respectively (step 605). The interface sensor controller 60, upon execution of its second configuration profile portion, reads D&I state and gamma state from D&I sensor 62 and gamma sensor 64, respectively (step 606). The EM controller 70, upon execution of its second configuration profile portion: reads the measurement data taken by sensors 54, 56 (steps 607) and sensors 62, 64 (step 608); sets the timing of the telemetry transmission based on the flow and RPM measurements (step 609); and operates the EM telemetry unit 75 in the manner specified in its second configuration profile portion (also step 609). Operation of EM telemetry unit 75 according to its second configuration profile portion may include: encoding measurement data using a specified modulation scheme; using a specified message frame type, composition and timing; operating the EM signal generator 72 to generate a telemetry signal (e.g. an AC telemetry signal); amplifying this signal with the EM amplifier 74; and applying the signal across the gap sub 78 via the H-bridge driver 76 (step 609).

Referring to FIG. 11, the status sensor controller 52 decodes a downlink command signal (step 701) to obtain downlink command instructions to execute the third configuration profile, and forwards these downlink command instructions to the other controllers 60, 70, 80, 90 (step 702). The power controller 90, upon execution of its third configuration profile portion closes the power switches to both EM controller 70 and EM telemetry unit 75 (steps 703) and MP controller 80 and MP telemetry unit 85 (steps 704) to power on these devices, if these switches are not already closed (in this example both are already closed). The status sensor controller 52, upon execution of its third configuration profile portion, reads flow state and RPM state information from flow switch sensor 54 and RPM gyro sensor 56, respectively (step 705). The interface sensor controller 60, upon execution of its third configuration profile portion, reads D&I state and gamma state from D&I sensor 62 and gamma sensor 64, respectively (step 706). The MP controller 80, upon execution of its third configuration profile portion, reads the measurement data taken by sensors 54, 56, 62, and 64 (step 707), and sets the timing of the telemetry transmission based on the flow and RPM measurements (steps 707), and then operates the MP telemetry unit 85 in the manner specified in the configuration profile to generate mud pulse telemetry signals (step 708). The EM controller 70, upon execution of its third configuration profile portion, communicates with the MP controller 80 to obtain the read measurement data (in a "mirrored data" operation) and sets the timing of the telemetry transmission based on the flow and RPM measurements (step 709) and operates the EM telemetry unit 75 in the manner specified in the configuration profile to generate EM telemetry signals (step 710).

Figure 11A:
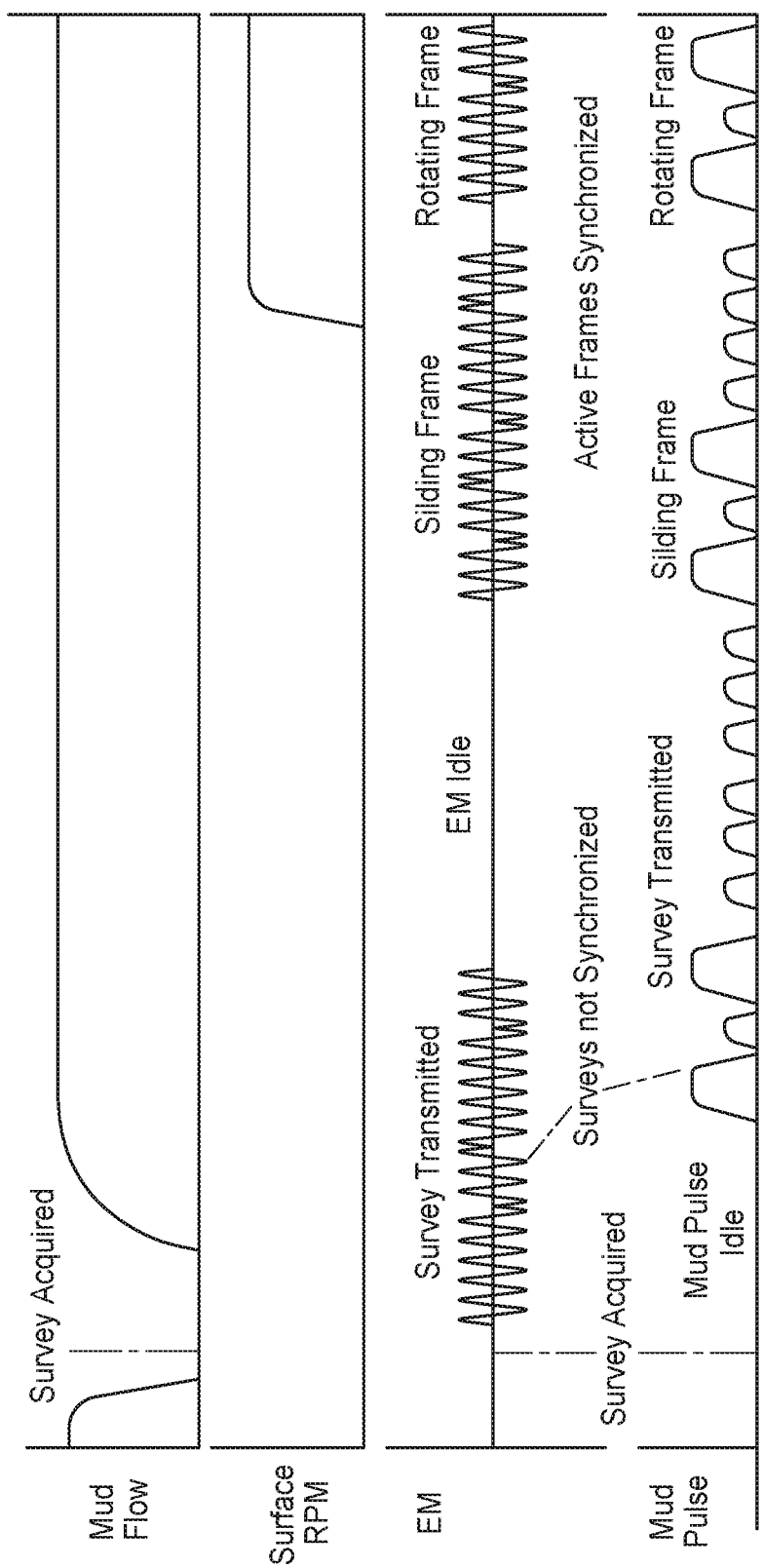
FIGS. 11A and 12A are graphs of mud flow, drill string rotation speed, EM telemetry transmission, and MP telemetry transmission as a function of time when a telemetry tool is operating in concurrent confirmation telemetry mode and concurrent shared telemetry mode, respectively.

The third configuration profile portions for the EM and MP controllers 70, 80, may include instructions relating to the type, composition, order and timing of the message frames in both the EM and MP telemetry transmissions. Referring to FIG. 11A, the third configuration profile may include, for example, instructions for the interface sensor controller 60 to take survey measurements using sensors (e.g. direction and inclination sensor 62, gamma sensor 64, etc.) and for the EM telemetry unit 75 to transmit a survey message frame containing the survey measurements during a "quiet" window while there is no mud flow or drill string rotation. Since mud flow is required for MP transmissions, the third configuration profile can also include instructions for the MP telemetry unit 85 to transmit a survey message frame while mud is flowing and before the drill string rotates. Since the telemetry tool is operating in a concurrent confirmation mode, the third configuration profile can also contain instructions for the EM and MP telemetry units 75, 85 to each send time-synchronized sliding frames containing the same data when mud is flowing and the drill string is not rotating. Finally, the third configuration profile can include instructions for the EM and MP telemetry units 75, 85 to then send time-synchronized rotating frames containing the same data when mud is flowing and the drill string is rotating.

Referring to FIG. 12, the status sensor controller 52 decodes a downlink command signal (step 801) to obtain downlink command instructions to execute the fourth configuration profile, and forwards these downlink command instructions to the other controllers 60, 70, 80, 90 (step 802). The power controller 90, upon execution of its fourth configuration profile portion, closes the power switches to both the EM controller 70 and EM telemetry unit 75 (steps 803) and the MP controller 80 and MP Telemetry Unit 85 (steps 804) to power on these devices, if these switches are not already closed (in this example both are already closed).

The status sensor controller 52, upon execution of its fourth configuration profile portion, reads flow state and RPM state information from flow switch sensor 54 and RPM gyro sensor 56, respectively (step 805). The interface sensor controller 60, upon execution of its fourth configuration profile portion, reads D&I state and gamma state from D&I sensor 62 and gamma sensor 64, respectively (step 806). The MP controller 80, upon execution of its fourth configuration profile portion, reads the measurement data taken by sensors 54, 56, 62, and 64 (steps 807), sets the timing of the telemetry transmission based on the flow and RPM measurements, and then operates the MP telemetry unit 85 in the manner specified in the configuration profile to generate mud pulse telemetry signals (step 808). The EM controller 70, upon execution of its fourth configuration profile portion, reads the measurement data taken by sensors 54, 56, 62, and 64 (steps 809) (in a "independent data acquisition" operation), sets the timing of the telemetry transmission based on the flow and RPM measurements, and operates the EM telemetry unit 75 in the manner specified in the configuration profile to generate EM telemetry signals (step 810).

Figure 12A:
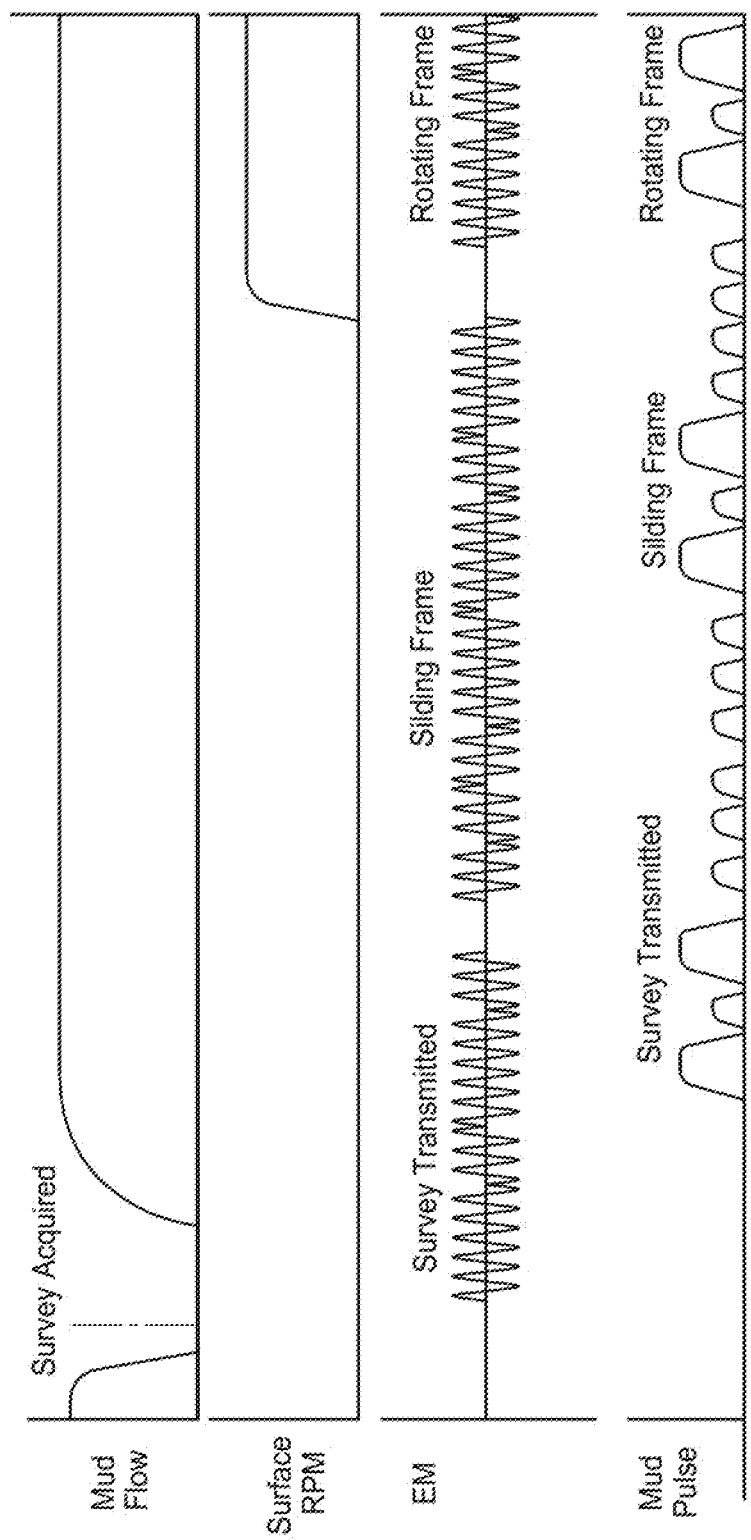

The fourth configuration profile portions for the EM and MP controllers 70, 80 may include instructions relating to the type, composition, order and timing of the message frames in both the EM and MP telemetry transmissions. Referring to FIG. 12A, the fourth configuration profile may include, for example, instructions for the interface sensor controller 60 to take survey measurements using sensors (e.g. direction and inclination sensor 62, gamma sensor 64, etc.) and for the EM telemetry unit 75 to transmit a survey message frame containing the survey measurements during a "quiet" window while there is no mud flow or drill string rotation.

Since mud flow is required for MP transmissions, the fourth configuration profile can also include instructions for the MP telemetry unit 85 to transmit a survey message frame while mud is flowing and before the drill string rotates. Since the telemetry tool is operating in a concurrent shared mode, the fourth configuration profile can also contain instructions for each of EM and MP telemetry units 75, 85 to independently send different data as specified by the configuration profile. For example, the fourth configuration can contain instructions for the EM telemetry unit 75 to transmit gamma, shock and vibration measurements in sliding and rotating frames, and for the MP telemetry unit 85 to transmit toolface measurements in sliding and rotating frames.

Allocation and Prioritization of Telemetry Data

Apparatus as described herein may include a data control system that controls what data is carried by which telemetry system. The data control system may also control when that data is transmitted (e.g. certain data may be transmitted more frequently than other data, certain data may be transmitted in real time or near-real-time and other data may be stored and transmitted later). Where two or more telemetry systems are provided, the data control system may be operable to selectively: transmit certain data on one telemetry system and no data on another telemetry system; transmit certain data on one telemetry system and other data on the other telemetry system; transmit certain data on more than one telemetry system; change the selection of data to be transmitted and/or the allocation of that data among the telemetry systems and/or how often certain data is transmitted. Where the same data is transmitted on different telemetry systems it is optionally possible to transmit updated data more frequently in one telemetry system than another.

The ability to allocate data between different telemetry systems can be used to advantage in a wide range of ways. For example, survey data may be sent by EM telemetry while active drilling is not in progress. This relieves the need to transmit survey data by MP telemetry and permits MP telemetry to be used to send active data as soon as the flow of drilling fluid is sufficient to support mud pulse telemetry. In an example method, a controller in telemetry system 40, 40A, 50 monitors a sensor output to determine whether active drilling is occurring. For example, the controller may monitor the output of a flow sensor. If active drilling is not occurring (no flow or low flow detected) then the controller may cause data, for example survey data, to be transmitted by EM telemetry. If active drilling is occurring (flow exceeds a threshold) then the controller may cause the data to be transmitted by MP telemetry.

As another example, data that might otherwise be transmitted by EM telemetry could be transmitted by MP telemetry instead in cases where rotating noise makes EM reception unduly difficult or unreliable or where horizontal drilling is being performed and overlying formations may impair the effectiveness of EM telemetry. In an example method, data is sent simultaneously by MP telemetry and EM telemetry. The EM telemetry data may be different from the MP telemetry data. A controller of a downhole system 40, 40A, 50 determines that EM telemetry is ineffective or undesired. The controller may make this determination, for example, based on one or more of: a current of an EM signal generator (too high current indicates conductive formations in which EM telemetry may be ineffective); a downlink signal from the surface using any available telemetry mode or predefined pattern of manipulation of drill string rotation and/or mud flow; an inclinometer reading (the system may be configured to not use EM telemetry once the inclination of the BHA is closer to horizontal than a threshold angle); and a measure of rotating noise. Upon determining that EM telemetry is ineffective or undesired the controller may automatically shut off the EM telemetry system and reallocate data being transmitted to the MP telemetry system such that a desired set of data is transmitted by MP telemetry.

As another example, the 'duty cycles' of the different available telemetry systems may be varied. Each telemetry system may be active at some times and off at other times. For example, where there is a need to transmit certain data that exceeds the available bandwidth of a preferred telemetry system, another telemetry system may be made active only for selected periods which are sufficient to carry the balance of the data to be transmitted. As another example, each telemetry system may be configured to actively transmit data in certain time slots and to be off in other time slots. This may be done independently for each telemetry system. The pattern of when a telemetry system will be on or off may be specified in a configuration profile. In another embodiment a telemetry system may operate on demand. When that telemetry system has data to transmit then the telemetry system may be made active for long enough to transmit the data. Otherwise the telemetry system may be kept in a non-transmitting state.

The data control system may comprise a switchboard that matches available data to available slots in a data transmission protocol or protocols. For example, in some embodiments, a telemetry system transmits data in frames which can each carry a certain amount of data. In such embodiments the data control system may match data to be transmitted to slots in data frames to be transmitted. With an architecture in which all sensor systems are interconnected by a data transmission bus (FIG. 3 is but one example of such an architecture) the data control system can transmit any selected data on any available telemetry system.

Various data transmission protocols may be used so that surface equipment will understand the significance of the transmitted data. For example:

the data control system may transmit control information indicating what data will be, is being or has been transmitted in available slots of a data transmission protocol.

the data control system may assign data to slots in a data transmission protocol according to instructions provided from the surface.

the data control system may be configured to assign data to slots in a data transmission protocol according to one or more predetermined arrangements.

the data may be distinguishable (e.g. outputs from certain different sensors may typically have values in ranges different from the outputs of other sensors) such that the assignment of data to slots in a data transmission protocol may be inferred from analysis of data received at the surface.

the data control system may assign data to slots in a data transmission protocol according to predetermined rules such that surface equipment can infer from the predetermined rules what data the data control system has assigned to different slots in a data transmission protocol.

the data control system may be configured to use different data transmission protocols for different arrangements of transmitted data such that surface equipment may infer the arrangement of transmitted data by determining what transmission protocol the data control system is using.

Other possibilities also exist. These methods may also be combined in any combinations to yield further methods. In some embodiments information regarding the arrangement of data being transmitted using one telemetry system is transmitted by another telemetry system.

A protocol may specify other aspects of transmitted signals such as a coding type to be used (e.g. 8PSK, QPSK, FSK, etc.) and bit rate.

Data Frames

In some example embodiments data is transmitted according to a protocol which specifies syntax for frames of one or more different types. Each frame may contain a group of data elements. Configuration information may assign different data to different frames. For example, one telemetry system may transmit the most recent measurements from direction and inclination sensor 62 in some frames and may transmit measurements from one or more of the remaining sensors in other frames. The frames may alternate such that frames carrying one selection of data are interleaved with frames carrying other selections of data.

Each frame may comprise a header section that establishes the timing, amplitude and type of message frame. For example, the header may comprise two parts that are transmitted as one continuous stream. The first part may comprise a specified fixed waveform. The waveform of the first part may have a pattern selected such that the pattern can be recognized by the surface processing equipment and is easily distinguished from noise. Transmission of this pattern may serve to synchronize the receiver to the timing and amplitude of the waveform. The second part of the header may comprise a variable waveform that functions to identify a type (ID) of the frame. The header section may include an identifier that enables a recipient of the frame to read and/or make sense of the data portion. The general composition of such message frames is known in the art and thus specific details are not discussed in further detail here.

Different frame types may be called for depending on the functions being carried out by the drill rig. For example:

Survey frames which include data that is typically high priority (e.g. inclination, azimuth, sensor qualification/verification data, plus other information as desired) may be sent in preparation for drilling. For example, survey frames may be sent by EM telemetry during a drill pipe connection or by MP telemetry as soon as sufficient mud is flowing.

Sliding frames may be sent during drilling when the drill string is not being rotated from the surface. Sliding frames may, for example be configured to send a steady stream of toolface readings and may also include additional data sent between successive toolface messages. In an example embodiment sliding frames may be defined by the data control system to consist of alternating toolface readings and gamma readings in the data portion of each frame. The header portion of a sliding frame may include a unique identifier, not shared by other types of frames, so that a recipient who receives the header portion of a sliding frame will know that the data portion that follows will conform to a known structure associated with that identifier.

Rotating frames may be sent while the drill string is rotating at the surface. Rotating frames typically do not include toolface data as such data is not generally relevant while the drill string is being rotated from the surface. Any other data may be included in rotating frames as desired.

Status frames may be sent at any time to alert surface equipment to the current status of a downhole system. Status frames may be sent, for example to signal a change or event, such as a change in the type(s) of telemetry being used, a significant change in sensor readings, a change in telemetry speed, or the like. Status frames may be generated to alert the receiver of changes in the telemetry type, speed, amplitude, configuration change, significant sensor change (such as a non-functioning or reduced-functioning accelerometer, for example), or other change to the status of the downhole tool. The sending of status frames may be triggered by particular events. For example, a downlink command received from the surface, a timer which calls for status frames to be transmitted at certain times, a configuration which calls for status frames to be transmitted at certain stages of drilling, or a sensor failure in the tool, or the like. A status frame may include an identifier which identifies which configuration profile is currently active on the downhole system and is being used to transmit the telemetry signals; this identifier will allow the surface transceiver 26 to select the correct demodulation and other decoding operations to decode the received signals at surface.

Other frame types may optionally be generated in other contexts.

The particular structure of the data portion of any type of frame may vary by embodiment or configuration of the data control system.

A downhole tool may be configured to switch automatically between transmitting different types of frames. For example, the downhole tool may comprise a flow sensor (which may monitor flow by detecting vibration of the tool). The tool may control when survey data is acquired and when the tool sends survey frames based on an output of the flow sensor. The tool may configure itself to send survey frames when the flow sensor detects no flow and may configure itself to send active frames (e.g. sliding frames or rotating frames) when the flow sensor detects flow in excess of a threshold flow. The tool may comprise an accelerometer or other rotation sensor and may automatically switch between transmitting sliding frames and rotating frames based on a detected rotation rate (with rotating frames being transmitted when the rotation rate exceeds a threshold). In some embodiments, a status sensor controller (e.g. status sensor controller 52) monitors sensor readings to determine a current drilling mode and triggers switching configurations to use different types of data frames when changes in the drilling mode are detected.

In some embodiments, configuration profiles stored in one or more downhole memories specify data content for a plurality of different predetermined frames. Each frame may specify a different set of data to send to the surface. An example of such an embodiment is illustrated by FIG. 6A. Telemetry controller 202 is configured to decide which frame(s) to send to the surface. This decision may be based upon downhole conditions picked up by sensors and/or downlink commands from the surface.

Different frames may specify different combinations of information (parameters) to be transmitted to the surface. For example, Frame '1' may include only data from a direction and inclination (D&I) system. Frame '2' may include a combination of data from the D&I system and data from a gamma system. Frame '3' may include a combination of data from the D&I system, data from one or more pressure sensors and other sensors' data etc. Any suitable number of predefined frames may be provided. The downhole system may be highly configurable so that an operator may set up the downhole system to provide frames that include any combination of data that may be expected to be useful for a proposed drilling operation.

Data Control Systems

A data control system may be implemented by one or more suitably configured controllers (e.g. controller 42 of FIG. 2 or one or more of controllers 42A, 42B of FIG. 2A or one or more of the controllers of apparatus 50). A data control system may be distributed. For example, a separate data control system may be provided for each telemetry system. These data control systems may operate independently of one another. Each of the data control systems may be configured to transmit certain items. The configurations of different data control systems may be complementary so that each necessary item of data is transmitted over one or more of the telemetry systems. In such embodiments it is possible but not mandatory for the data control systems to interact with one another in normal operation.

In other embodiments the data control system is centralized and allocates data to available transmission slots for two or more telemetry systems. In still other embodiments each telemetry system includes a quasi-independent data control system but one of the data control systems acts to coordinate operation of other data control systems. In other embodiments, the data control system includes a central part that coordinates operation of subsystems associated with the different telemetry systems.

Figure 6:
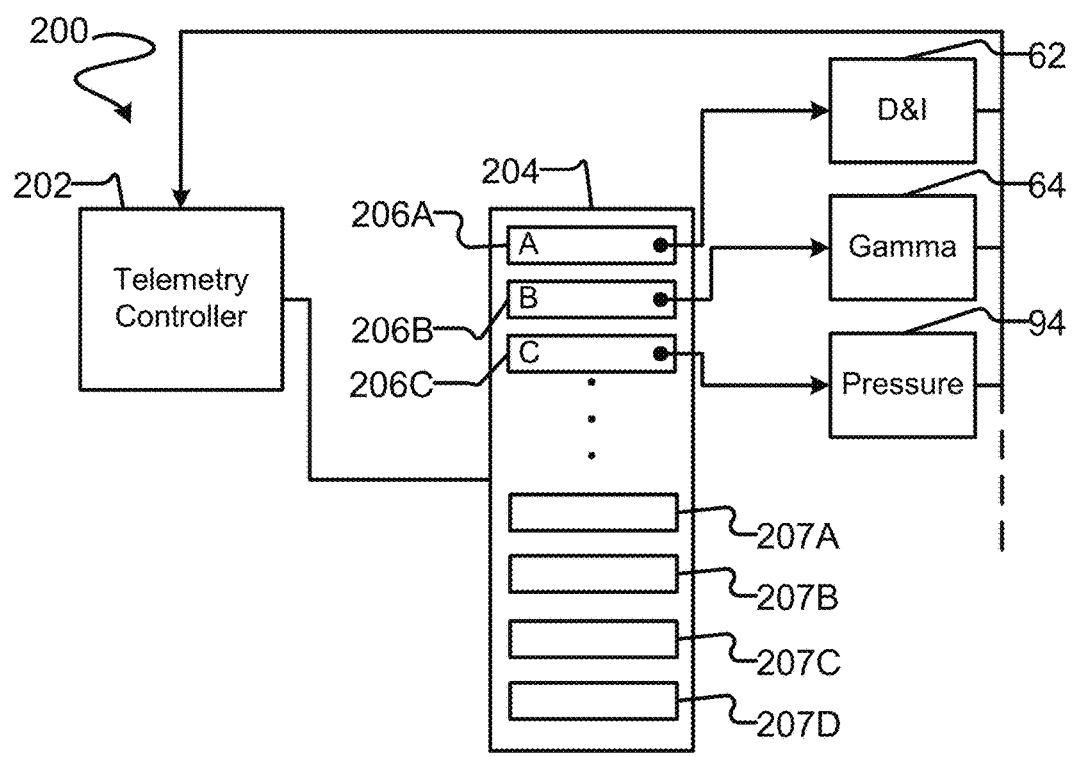
FIG. 6 is a schematic view of an example telemetry configuration system.
Figure 6A:
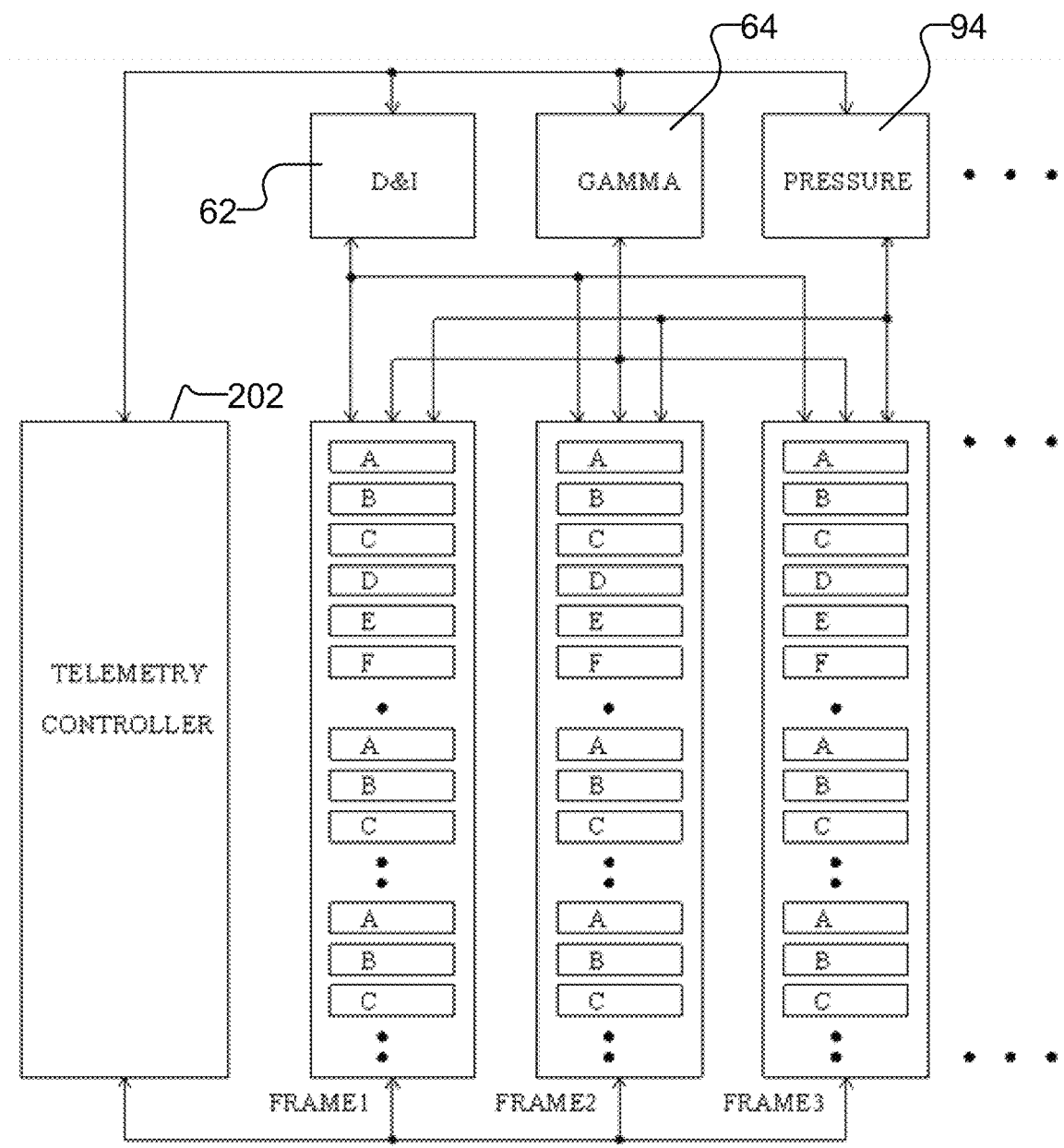
FIG. 6A is a schematic view of an alternative telemetry configuration system.

FIG. 6 shows schematically an example telemetry configuration system 200 that includes a telemetry controller 202. Telemetry controller 202 may be, for example implemented by software code executing on EM controller 70 or MP controller 80. Telemetry controller 202 may more generally be any controller of control system 42 that is connected to a data bus that permits it to access data that could be transmitted and telemetry systems available to transmit the data.

Telemetry controller 202 has access to data storage 204. Data storage 204 may be a memory accessible by telemetry controller 202, a set of registers housed within telemetry controller 202 (if telemetry controller 202 comprises a CPU or other register-containing device), or any other suitably-configured device, system or service capable for storing information accessible to a telemetry controller 202.

Data storage 204 includes one or more data locations 206. For example, data storage 204 includes data locations 206A, 206B and 206C. Each data location 206 may store or identify (e.g. by way of an address or pointer) an item of data that may be transmitted by a telemetry system. In the example shown in FIG. 6, data location 206A corresponds to data from direction and inclination sensor 62, data location 206B corresponds to data from gamma sensor 64, and data location 206C corresponds to data from pressure sensor 94. Data locations 206 collectively provide data that is available to be included in data to be transmitted to surface transceiver 26 by a telemetry system.

Data storage 204 includes one or more data locations 207. For example, data storage 204 includes data locations 207A, 207B, 207C and 207D. Each data location 207 may correspond to an available slot in which an item of data may be transmitted by a telemetry system. Each data location 207 may include a value that identifies one of data locations 206. Thus, the sequence of items of data to be transmitted by a telemetry system may be controlled by writing values to data locations 206 which identify data to be transmitted and values to data locations 207 which identify the sequence in which that data will be transmitted by a telemetry system. In some embodiments, different sets of data locations 207 may be provided for different telemetry systems.

Those of skill in the art will understand that a similar result may be achieved using a single set of data locations for each telemetry system in which the single set of data locations each corresponds to an available transmission slot and each can contain or identify an item of data to be transmitted.

Telemetry controller 202 maps data locations 206 to the contents of data frames for transmission. For example, telemetry controller 202 may be configured to transmit the data identified by data location 206A and 206B in one frame, and to transmit data identified by data locations 206C, 206D and 206E (data locations 206D and 206E not depicted) in the next frame. On subsequent frames, telemetry controller 202 may advance to yet further data locations 206F (not depicted) and so on or, if no further data locations are available, may loop back to data locations 206A and 206B.

As another example, telemetry controller 202 may be configured to transmit the data identified by one or more data locations 206 (such as 206A) in each frame, and to vary which of the data associated with the remaining data locations 206 are included in each of the subsequent frames.

For example, if a telemetry controller 202 is configured such that each frame includes the data identified by the next three data locations 206 in sequence, every third data location 206 might be encoded with data originating from a highly important sensor, such as direction and inclination sensor 62, thereby ensuring that direction and inclination information is transmitted in every frame, while still leaving room for additional sensor information to be cycled through in subsequent frames. A similar result may be achieved by encoding only one data location 206 (suppose data location 206A) in a given data storage 204 with data identifying direction and inclination sensor 62 and configuring telemetry controller 202 to include the data identified by data location 206A in every frame.

Although it is possible for telemetry systems to operate independently, or for a downhole system to transmit data using fewer than all available telemetry systems 46 (e.g. in "EM-only" or "MP-only" modes), in at least some embodiments telemetry systems operate cooperatively to transmit data. Any one or more controllers may be configured to transmit information on one or more telemetry systems. Which data is transmitted via which telemetry systems may be determined in response to the current configuration of the downhole system (for example as specified by a configuration profile) and, in some embodiments, a telemetry configuration system such as example telemetry configuration system 200.

Conditional Transmission of Selected Data

In some embodiments, telemetry controller 202 or, more generally, control system 42 may be configured to monitor certain parameters and to determine whether or not to transmit values for the monitored parameters to the surface by telemetry based on changes in the parameter values. Changes may be measured over a time frame (e.g. how much has the parameter value changed in the past 10 seconds or the past minute or the past 10 minutes or the past hour) and/or in relation to the most-recently transmitted value for the same parameter.

For example, in one example embodiment control system 42 records values of a number of parameters as previously transmitted to the surface by telemetry. Control system 42 then compares a current value of a parameter to the previously-transmitted value for the parameter. If this comparison indicates that the value for the parameter has changed by more than a threshold amount then the controller may be configured to transmit the current value for the parameter to the surface. If the comparison indicates otherwise then controller 42 may skip transmitting the current value for the parameter. The comparisons may be made in any suitable way (e.g. subtracting one of the current and previously-transmitted parameter values from the other, determining a ratio of the current and previously-transmitted parameter values etc). Different change thresholds may be provided for different parameters.

In addition or in the alternative control system 42 may record values of the parameters at intervals (which may optionally be different for different parameters) and may compare a currently-recorded value for a parameter to a previous value (or an average or weighted average of a number of previous values) and determine whether the change exceeds a threshold. Again, different thresholds may be provided for different parameters.

Comparisons as described above may be made periodically, and/or each time a new value for a parameter is obtained and/or each time there is an opportunity for transmission of such parameter values.

In some embodiments control system 42 may prioritize transmission of current parameter values which are different enough from previous values (for example according to differences as determined above) to require retransmission. Parameter values that are not different enough from previous values do not need to be transmitted. One advantage of transmitting certain parameter values only if the values have changed is that the amount of power required for data transmission may be reduced and battery life may therefore be extended. Another advantage that may be achieved in some embodiments is freeing bandwidth to transmit other data.

Prioritizing of such transmissions may be based upon one or both of a predetermined priority order and an amount of change of the parameter. In an example embodiment, control system 42 maintains an ordered list of the monitored parameters. Control system 42 determines as above whether it is desirable to transmit a current value for any of the parameters. When an opportunity arrives to transmit values for one or more of the parameters controller 42 may proceed down the ordered list and transmit the highest-priority ones of the parameters for which control system 42 has determined that the current value of the parameter should be transmitted. Where the opportunity exists to transmit N current parameter values where N is some integer then control system 42 may send the N highest-priority ones of the parameters for which control system 42 has determined that the current value of the parameter should be transmitted. Control system 42 may additionally transmit in a header or other information identifying the specific parameter values being transmitted.

As a specific example, a control system 42 may be configured to transmit data in sets (e.g. frames) on one or more telemetry systems. Some frames may be reserved for specific data. For example, the first frame and every third frame after that may carry a first type of information (e.g. direction and inclination information). The second frame and every third frame after that may carry a second type of information (e.g. gamma information). The third frame and every third frame after that may be configured to carry variable information (i.e. one or more current values for parameters which have been selected for transmission based on a change in their values).

As another example, a control system 42 may be configured to send data in frames in which a portion of some or all frames is allocated to carry current values for selected parameters that have changed enough to require retransmission (if any). Where a selected parameter has changed by less than a threshold amount since a last time a value for the selected parameter was transmitted transmission of the value of the selected parameter may be suppressed.

As another example, control system 42 may be configured to send data for a plurality of parameters in a sequence. Control system 42 may check to determine whether it is unnecessary to transmit some or all of the parameters (e.g. it may be unnecessary to transmit a current parameter value if the current parameter value is close to the previously-transmitted parameter value).

Where controller 42 determines that transmitting current values for one or more other parameters is unnecessary then controller 42 may be configured to perform one or more of:
 leaving a gap where the parameter value would have been transmitted;
 transmitting one or more special symbols in the slot where the parameter value would have been transmitted (the symbols may optionally be selected for low power consumption and/or low latency); or
 compressing the remaining data together (and, if necessary or desired, transmitting information identifying the data transmitted and/or not transmitted).

In some embodiments control system 42 monitors two or more different sets of parameters (the sets of parameters could optionally have some or all members in common). Each telemetry system of a plurality of telemetry systems may be associated with one of the sets of parameters and configured to transmit current values for parameters from the corresponding set of parameters that have changed enough to require retransmission (if any).

In some embodiments each telemetry system comprises a separate controller and the controller is configured to monitor parameters in the corresponding set and to transmit current values of the parameters where a condition relating to a change in the parameter value is satisfied. For example, an EM telemetry system may include a controller configured to monitor parameters such as inclination, shock and stick-slip and may transmit current values for one or more of these parameters in response to determining that the current value(s) of the one or more parameters has changed by more than a threshold amount relative to a previous value(s) for the one or more parameters. In the same apparatus an MP telemetry system may include a controller configured to monitor values for a different set of parameters such as battery voltage (or state of charge), azimuth and temperature.

In some embodiments, a control system implements a method which comprises periodically transmitting certain data on a telemetry system and conditionally transmitting other data ('conditional data') on the telemetry system. The condition may relate to a difference between a current value for the conditional data and a previous value for the conditional data and/or a comparison of the conditional data to a threshold (e.g. certain data may be transmitted if its value is lower than a threshold, other data may be transmitted if its value exceeds a threshold).

In another embodiment, system 42 may apply an algorithm that uses previously-transmitted data (e.g. previously-transmitted values for the parameter) to predict a current value of a parameter. System 42 may transmit the current value of the parameter if it differs from the value predicted by the predictive algorithm by more than a threshold amount. System 42 may suppress transmission of the current value of the parameter if the predictive algorithm is doing a good job of estimating the current parameter value (e.g. the value predicted by the predictive algorithm differs from the current parameter value by less than a threshold amount). In some embodiments the predictive algorithm comprises fitting a function to two or more previously-transmitted values of the parameter. The function may, for example, comprise a linear function, a second- or higher-degree polynomial function, a spline function, etc. Where system 42 does not transmit the current value of the parameter, surface equipment may use the predictive algorithm and previously-transmitted parameter values to estimate the current value of the parameter.

As another example, a telemetry system may be configured to transmit a certain set of data. The telemetry system may monitor priority levels of one or more sensors. The priority levels may be determined, for example, according to one or more of: a length of time since data from the sensor was last transmitted; a rate of change of the data from the sensor; a pattern of data from one or more sensors satisfying a rule; a cumulative change since data from the sensor was last transmitted; a predetermined priority level associated with the sensor (such that, for example, new data from the sensor is automatically assigned a high priority); and/or the like. In response to determining that data from one or more sensors has a priority higher than a threshold level the telemetry system may automatically insert data from the high-priority sensor(s) into a special frame or a special location in an existing frame.

A telemetry system that includes plural telemetry transmitters may optionally be configured to deliver diagnostic information regarding one telemetry transmitter (and any associated systems) by way of another telemetry transmitter. The diagnostic information may, for example, comprise information such as: status information for various subsystems; measured values such as power voltage and/or current, diagnostic readings from applicable circuits or circuit boards; and the like. Such information may be transmitted while the telemetry system is still downhole and used by surface personnel to diagnose and prepare to repair the other telemetry system, if necessary.

A signal receiver at the surface may be configured to keep track of when each received parameter value was last updated. The signal receiver may optionally detect gaps in telemetry data where a parameter value is omitted (e.g. because control system 42 has determined that the current value of a parameter is close to—differs by less than a threshold amount from—a most-recently transmitted value for the parameter) and/or other telemetry signals indicating that the current parameter value is not being transmitted. The signal receiver may display parameters in a manner that indicates how recently displayed values for different parameters were received (e.g. by displaying parameter values in certain colors and/or fonts and/or displaying indicia associated with the parameter values).

Where a surface system detects that current values for one or more parameters have not been included in a received transmission then the surface system may optionally display an indicia which indicates that the displayed value was not received in the most-recently-transmitted set of parameter values. For example, the surface system may display a symbol, display the parameter value in a particular font, color, font attribute (e.g. flashing) or the like. As another example, the surface system may annotate a displayed value for the parameter with a tolerance amount. For example, suppose that a parameter has a current value of 18.0 degrees, a previously-transmitted value of the same parameter was 17.5 degrees and a threshold for change of the parameter is 0.9 degrees. Since the current value for the parameter differs from the previously-transmitted value of the parameter by 0.5 degrees, which is less than the threshold of 0.9 degrees, then control system 42 may omit sending the current parameter value. The surface system may have access to the threshold (in this example 0.9 degrees) and, knowing that the parameter has been omitted, may display 17.5±0.9 degrees as the value for the parameter. Suppose that the value for the parameter subsequently changes to 18.5 degrees. Now the difference between the current value of the parameter and the most-recently transmitted value of the parameter exceeds the threshold (since 18.5-17.5>0.9). Therefore control system 42 may transmit the current value of the parameter and the surface system may display the current value of the parameter (without necessarily displaying a tolerance range or otherwise indicating that the displayed value was not received in the most-recently-transmitted set of parameter values).

Other examples in which data may be transmitted conditionally include cases where it may be difficult or costly in terms of battery life to transmit certain data. For example, in very deep work, a system as described herein could be configured to send EM survey data in periods between active drilling only in cases where noise during active drilling may be too high for reception while drilling. This saves battery life and allows for faster surveys.

Receiving Telemetry Data

A significant feature of some embodiments is a single surface system for receiving and decoding telemetry that has been transmitted by a plurality of distinct telemetry subsystems of a downhole system. Providing such a single system permits data to be split among two or more different telemetry subsystems at the downhole system and then recombined at the surface equipment in a way that is seamless to users. All information transmitted by telemetry from the downhole system may be presented on a single display or set of displays in a consistent manner. Further, as described elsewhere herein, with such a system, telemetry information provided by way of one telemetry subsystem (e.g. an EM telemetry subsystem) may be used to support telemetry provided by way of another telemetry subsystem (e.g. an MP telemetry subsystem). This support may include transmitting configuration information indicating a way in which data is being encoded on the other telemetry subsystem, transmitting overflow data, carrying the data of a malfunctioning telemetry system or the like.

Figure 13:
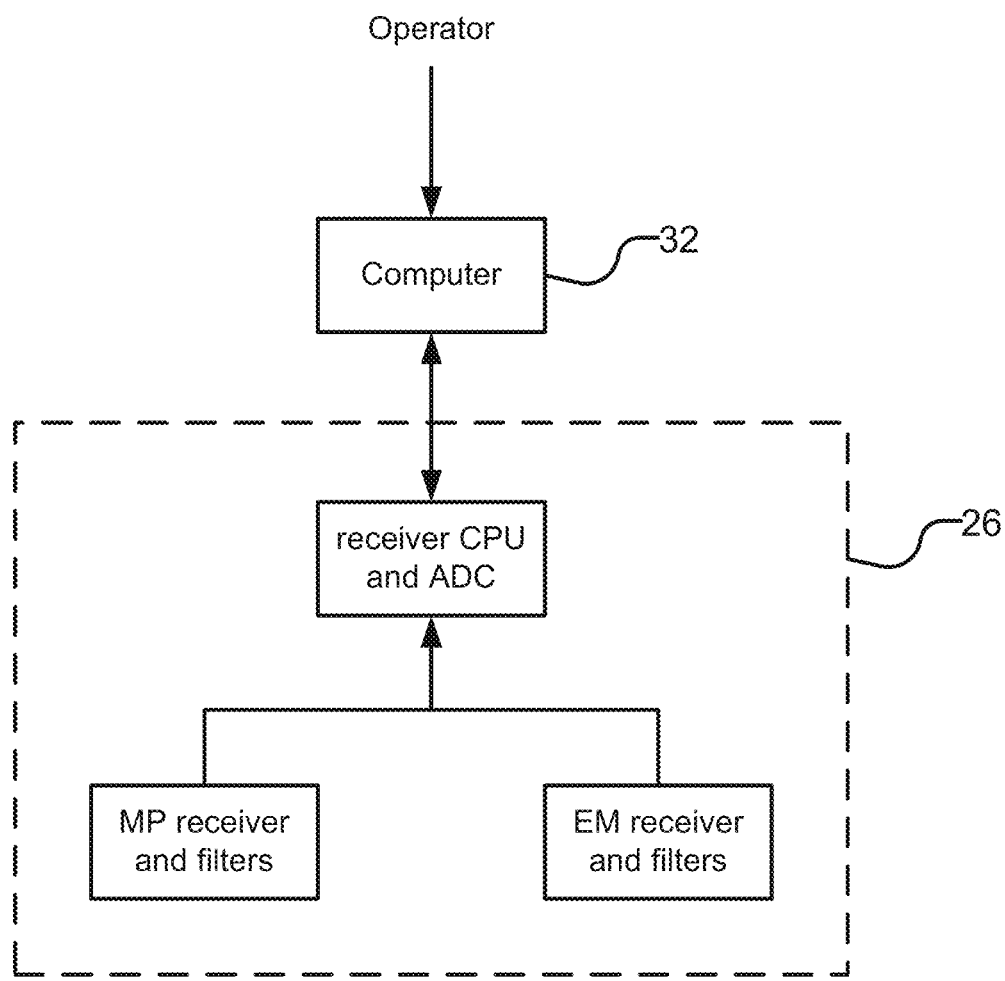
FIG. 13 is a schematic block diagram showing surface components of an example telemetry system.

Referring to FIG. 13, the surface transceiver 26 detects and processes the EM and MP telemetry signals transmitted by the telemetry apparatus 50, and sends these signals to computer 32 which decodes these signals to recover the telemetry channels and to convert measurement data for use by the operator. Computer 32 includes executable program code containing demodulation technique(s) corresponding to the selected modulation technique(s) used by the EM and MP telemetry units 75, 85 which are used to decode the modulated telemetry signals. The computer 32 also contains the same set of configuration profiles that were downloaded onto the telemetry apparatus 50, and may refer to the specific configuration profile used by the telemetry apparatus 50 to decode the received telemetry signals that were transmitted according to that configuration profile.

Surface transceiver 26 may include an MP receiver and filters, an EM receiver and filters, a central processing unit (receiver CPU), and an analog to digital converter (ADC). More particularly, surface transceiver 26 may comprise a surface receiver circuit board containing the MP and EM receivers and filters. The EM receiver and filter may comprise a preamplifier electrically coupled to the communication cables 27 to receive and amplify the EM telemetry transmission comprising the EM carrier wave, and a band pass filter communicative with the preamplifier configured to filter out unwanted noise in the transmission. The ADC may also be located on the circuit board and may operate to convert the analog electrical signals received from the EM and MP receivers and filters into digital data streams. The receiver CPU may contain a digital signal processor (DSP) which applies various digital signal processing operations on the data streams by executing a digital signal processing program stored on its memory. Alternatively, separate hardware components can be used to perform one or more of the DSP functions; for example, an application-specific integrated circuit (ASIC) or field-programmable gate arrays (FPGA) can be used to perform the digital signal processing in a manner as is known in the art. Such preamplifiers, band pass filters, and A/D converters are well known in the art and thus are not described in detail here. For example, the preamplifier can be an INA118 model from Texas Instruments, the ADC can be an ADS1282 model from Texas Instruments, and the band pass filter can be an optical band pass filter or an RLC circuit configured to pass frequencies between 0.1 Hz to 20 Hz.

Computer 32 may be communicative with the surface transceiver 26 via an Ethernet or other suitable communications cable to receive the processed EM and MP telemetry signals and with the surface operator to receive the identity of the configuration profile the telemetry apparatus 50 is using to transmit the telemetry signals ("operating configuration profile"). Computer 32 in one embodiment is a general purpose computer comprising a central processing unit (CPU and herein referred to as "surface processor") and a memory having program code executable by the surface processor to perform various decoding functions including digital signal-to-telemetry data demodulation. The computer 32 may also include program code to perform digital signal filtering and digital signal processing in addition to or instead of the digital signal filtering and processing performed by the surface transceiver 26.

The surface processor program code may utilize demodulation techniques that correspond to the modulation techniques used by the telemetry apparatus 50 to encode the measurement data into the EM and MP telemetry signal. These modulation techniques are applied to the EM and MP telemetry signals received by the surface transceiver 26 to recover the measurement data.

Alternatively, or additionally, the surface transceiver 26 and/or computer 32 may be programmed to retrieve the identity of the operating configuration profile used by the telemetry apparatus 50 from the telemetry signals themselves. The identity of the operating configuration profile may be located in the status frame, or another message frame. The operating configuration profile identity can also be repeated in the telemetry signal, e.g. at the end of a survey frame.

In some embodiments, surface equipment may be connected to sensors from which a current drilling mode can be inferred. For example, a surface sensor may determine whether drilling fluid is flowing or not in the wellbore. In some embodiments data from an MP transducer at the surface is processed to determine whether or not fluid is flowing in the wellbore.

A downhole system as described herein may be configured to send certain information at times that are synchronized to changes in a drilling mode. For example, a downhole system may be configured to cause an EM subsystem to send a long header (specifying a way in which data will be transmitted by EM and/or MP telemetry) at a specified time after a flow-off condition starts. The surface equipment may, for example, detect the onset of the flow-off condition by monitoring an output of a pressure transducer at the surface (which may also serve as a detector for MP telemetry pulses at the surface). The surface equipment may then process EM telemetry data to look for a long header at the applicable time.

Alternatively, or in the event that the surface transceiver 26 and/or computer 32 cannot retrieve the identity of the operating configuration profile from the telemetry signal, or does not receive the identity of the operating configuration profile from the operator, or there is a mismatch between the identities detected in the telemetry signal and provided by the operator, the surface transceiver 26 and/or computer 32 can be programmed to attempt to decode the received telemetry transmission in all known telemetry modes and using all known demodulation techniques until the correct telemetry mode and demodulation technique is found.

Computer 32 may further contain program code executable by its processor to process telemetry signals transmitted by the telemetry apparatus 50 in the concurrent shared or confirmation modes. More particularly, when the transmission was made in the concurrent shared mode, program code may be executed which combines the measurement data from the MP and EM data channels into a single data stream for display to the operator. When the transmission was made in the concurrent confirmation mode, program code may be executed which compares the received EM and MP telemetry signals and selects the telemetry signal providing the highest confidence value to decode and obtain the measurement data.

Certain embodiments described herein offer the advantage of multiple different telemetry types and the flexibility to use different telemetry systems in different ways (examples of which are described above) in a system in which power is supplied by a common set of batteries and data is acquired by a common set of sensors accessible to each of the telemetry systems. While a downhole tool according to some embodiments may have the capability to make autonomous decisions regarding data telemetry this is not necessary in all embodiments.

An advantage of some embodiments is great flexibility in that a downhole tool may be configured to perform according to the preferences of a drill rig operator. The downhole tool may be configured to use a selected single telemetry system (with all others inhibited) if that meets the operator's requirements. In other cases the downhole tool may be configured in any of the ways described above to use two or more telemetry systems, thereby providing more data of a given type, data of more different types, and/or data having higher reliability.

While a number of exemplary aspects and embodiments have been discussed above, those of skill in the art will recognize certain modifications, permutations, additions and sub-combinations thereof. All such modifications, permutations, additions and sub-combinations are included in the invention described herein.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Headings are included for convenience only and are not to be used to interpret the meaning of the disclosure or claims.

Where a component (e.g. a circuit, system, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

All headings in this document are for convenience of the reader only. Text under any heading may also relate to other headings. The wording of the headings themselves does not limit in any way the meaning of any text.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A drilling method comprising:
    advancing a drill string while pumping a drilling fluid through a bore of the drill string during active drilling periods separated by flow-off periods during which a flow of the drilling fluid through the drill string is discontinued; and
    communicating telemetry data from a downhole system to a-surface equipment using one or both of EM telemetry and MP telemetry;
    wherein the drilling method comprises, at the downhole system:
        transmitting the telemetry data by the EM telemetry;
        monitoring an electrical output current of an EM telemetry transmitter; and
        if the electrical output current meets or exceeds a predetermined threshold, automatically switching to transmit the telemetry data by the MP telemetry;
    wherein:
        the telemetry data transmitted by the EM telemetry comprises a predetermined set of sensor readings;
        said automatically switching to transmit the telemetry data by the MP telemetry comprises transmitting a reduced set of the sensor readings by the MP telemetry; and
        the reduced set of the sensor readings comprises some or all of the sensor readings of the predetermined set of the sensor readings presented at a reduced data resolution, wherein the reduced data resolution uses fewer data bits to represent the some or all of the sensor readings of the predetermined set of sensor readings included in the reduced set of the sensor readings than a number of data bits used to represent corresponding ones of the sensor readings of the predetermined set of the sensor readings transmitted by the EM telemetry.

2. The drilling method of claim 1, wherein said automatically switching to transmit the telemetry data by the MP telemetry further comprises shutting down the EM telemetry transmitter or placing the EM telemetry transmitter in a non-transmitting mode.

3. The drilling method of claim , wherein the reduced set of the sensor readings does not include one or more of the sensor readings of the predetermined set of the sensor readings transmitted by the EM telemetry.

4. The drilling method of claim 1, wherein said automatically switching to transmit the telemetry data by the MP telemetry further comprises having a control system of a MP telemetry system execute a new configuration profile to configure the MP telemetry system to transmit the telemetry data by the MP telemetry system.

5. The drilling method of claim 4, wherein the new configuration profile specifies that the EM telemetry transmitter is to be shut off or inhibited and a transmission sequence for the telemetry data that is to be transmitted by the MP telemetry system.

6. The drilling method of claim 1, further comprising transmitting one or more status frames to the surface equipment indicating that the electrical output current of the EM telemetry transmitter meets or exceeds the predetermined threshold.

7. The drilling method of claim 1, wherein said automatically switching to transmit the telemetry data by the MP telemetry further comprises disconnecting supply of power to the EM telemetry transmitter.

8. The drilling method of claim 1, further comprising providing a plurality of stored configuration files to an MP telemetry system wherein said automatically switching to transmit the telemetry data by the MP telemetry further comprises configuring the MP telemetry system according to one of the stored configuration files.

9. The drilling method of claim 1, wherein the telemetry data comprises one or more of inclination data, azimuth data and sensor qualification and verification data.

10. The drilling method of claim 1, wherein the telemetry data comprises one or more of toolface readings, gamma readings and rotating frames.

11. The method of claim 1, wherein said automatically switching to transmit the telemetry data by the MP telemetry further comprises transmitting telemetry information usable by the surface equipment to decode MP telemetry transmissions.

12. The method of claim 1, further comprising, at the surface equipment, conducting an error check matching protocol on a received MP telemetry signal and assigning a confidence value to the received MP telemetry signal based on results from the error check matching protocol.

* * * * *